(12) United States Patent
Zeng et al.

(10) Patent No.: US 11,085,824 B2
(45) Date of Patent: Aug. 10, 2021

(54) COHERENT ANTI-STOKES RAMAN SCATTERING IMAGING METHOD, AND LIGHT SOURCE FOR THE SAME

(71) Applicants: Chongqing Institute of East China Normal University, Chongqing (CN); East China Normal University, Shanghai (CN); University of Shanghai for Science and Technology, Shanghai (CN)

(72) Inventors: Heping Zeng, Chongqing (CN); Kangwen Yang, Chongqing (CN); Xu Chen, Chongqing (CN); Yue Shen, Chongqing (CN); Shikai Zheng, Chongqing (CN)

(73) Assignees: CHONGQING INSTITUTE OF EAST CHINA NORMAL UNIVERSITY, Chongqing (CN); EAST CHINA NORMAL UNIVERSITY, Shanghai (CN); UNIVERSITY OF SHANGHAI FOR SCIENCE AND TECHNOLOGY, Shanghai (CN)

( * ) Notice: Subject to any disclaimer, the term of this patent is extended or adjusted under 35 U.S.C. 154(b) by 0 days.

(21) Appl. No.: 17/013,749

(22) Filed: Sep. 7, 2020

(65) Prior Publication Data
US 2021/0108963 A1     Apr. 15, 2021

(30) Foreign Application Priority Data

| Oct. 14, 2019 | (CN) | 201910971378.9 |
| Oct. 16, 2019 | (CN) | 201910982331.2 |
| Oct. 16, 2019 | (CN) | 201910983122.X |

(51) Int. Cl.
| G01J 3/44  | (2006.01) |
| G01N 21/65 | (2006.01) |
| G01J 3/28  | (2006.01) |

(52) U.S. Cl.
CPC ............. *G01J 3/44* (2013.01); *G01J 3/2823* (2013.01); *G01N 21/65* (2013.01); *G01N 2021/653* (2013.01)

(58) Field of Classification Search
CPC .... G01J 3/44; G01J 3/02; G01J 3/2823; G01J 3/0218; G01N 21/65; G01N 21/64; G01N 2021/653; A61B 5/0075
See application file for complete search history.

(56) References Cited

U.S. PATENT DOCUMENTS

2015/0369742 A1* 12/2015 Tamada ............... G01N 21/65
356/301

FOREIGN PATENT DOCUMENTS

| CN | 1983746   | 6/2007  |
| CN | 201365066 | 12/2009 |
| CN | 108963748 | 12/2018 |

OTHER PUBLICATIONS

SIPO, Office Action for CN Application No. 201910971378.9, dated Aug. 3, 2020.

(Continued)

*Primary Examiner* — Abdullahi Nur
(74) *Attorney, Agent, or Firm* — Hodgson Russ LLP

(57) ABSTRACT

The disclosure provides a super-resolution fast-scanning coherent Raman scattering imaging method. The method: using pump light and Stokes light; combining the pump light and the Stokes light to obtain combined light; expanding/collimating the combined light; the combined light after the expanding/collimating entering a galvanometer, passing through a group of a scanning lens/a tube lens and being focused on a back focal plane of a microobjective and (Continued)

incidenting into a biological sample, such that the biological sample is excited to emit anti-Stokes light; collecting the excited anti-Stokes light by a detector. This method is characterized by deflecting, at different angles, a single light spot focused on the microobjective through a diffractive optics group including DOE and a dispersive element, into a plurality of 1×N light spots to incident into the biological sample, such that the anti-Stokes light excited from smaller molecules and being condensed and filtered, is collected by the detector.

18 Claims, 9 Drawing Sheets

(56) References Cited

OTHER PUBLICATIONS

SIPO, Office Action for CN Application No. 201910982331.2, dated Aug. 13, 2020.

* cited by examiner

COHERENT ANTI-STOKES RAMAN SCATTERING IMAGING METHOD, AND LIGHT SOURCE FOR THE SAME

CROSS REFERENCE TO RELATED APPLICATION(S)

This application claims priority to Chinese Patent Application Nos. 201910983122.X and 201910982331.2, each filed Oct. 16, 2019, and Chinese Patent Application No. 201910971378.9, filed Oct. 14, 2019. The entire disclosures of the aforementioned applications are incorporated herein by reference.

TECHNICAL FIELD

The disclosure relates to the field of spectral imaging technologies, and more particularly to a super-resolution fast-scanning coherent anti-Stokes Raman scattering (CARS) imaging method, and a multi-wavelength tunable synchronous light source with acousto-optic electromechanical linkage.

BACKGROUND

Research on CARS microscopic imaging has gradually mature in recent years. The CARS microscopic imaging with high resolution and sensitivity, label-free, non-invasive and 3-dimensional imaging, has become indispensable in biological research, which has greatly assisted people in obtaining information of biological samples and made people understand the richer microscopic world. As applications of the CARS microscopic imaging in biological research becomes more and more extensive, it becomes more and more urgent to improve the resolution and imaging rate of the CARS microscopic imaging.

SUMMARY

According to a first aspect of the disclosure, a coherent anti-Stokes Raman scattering imaging method is provided. The method includes: emitting a beam of pump light and a beam of Stokes light; combining the beam of pump light and the beam of Stokes light to a beam of combined light; expanding and collimating the beam of combined light, the beam of combined light after the expanding and collimating entering a galvanometer, passing through a group of a scanning lens and a tube lens and being focused on a back focal plane of a microobjective to form a single light spot; deflecting, at different angles, the single light spot focused on the back focal plane of the microobjective through a diffractive optics group including a diffractive optical element (DOE) and a dispersive element, into a plurality of light spots to incident into a biological sample, such that anti-Stokes light is excited from the biological sample; and collecting the excited anti-Stokes light to obtain an image of the biological sample.

According to a second aspect of the disclosure, a light source is provided. The light source, includes, along an optical path, sequentially a reflective element, a dispersive element, a first optical switch, a gain medium, a first output coupler, a mode-locking element, and a pump source for effecting on the gain medium independently, the first output coupler outputting a beam of seed light; a wavelength division multiplexer, a second output coupler, a polarization controller and a second optical switch in turn along the optical path, in which the seed light passes through the wavelength division multiplexer, the second output coupler, the polarization controller and the second optical switch in turn; a first branch; and a second branch, in which the beam of seed light is divided into two beams of light, one of the two beams of light enters the first branch and returns the wavelength division multiplexer through the first branch, and another of the two beams of light enters the second branch and returns the wavelength division multiplexer through the second branch; in which, the first branch comprises a first parametric medium, a third optical switch, a first delay device, a second delay device, and a first beam combiner, the one of the two beams of light enters the first parametric medium and the third optical switch and is divided into two sub beams of light by the third optical switch, one of the two sub beams of light enters the first delay device, another of the two sub beams of light enters the second delay device, and then the two sub beams of light are combined by the first beam combiner and return to the wavelength division multiplexer; the second branch comprises a second parametric medium, a fourth optical switch, a third delay device, a fourth delay device, and a second beam combiner, the another of the two beams of light enters the second parametric medium and the fourth optical switch and is divided into two another sub beams of light by the fourth optical switch, one of the two another sub beams of light enters the third delay device, another of the two another sub beams of light enters the fourth delay device, and the two another sub beams of light are combined by the second beam combiner and return to the wavelength division multiplexer; the wavelength division multiplexer is configured to converge a plurality of beams of light into one beam of light, the second output coupler is configured to form a loop of a parametric resonant cavity and realize multi-wavelength tunable pulse output; the polarization controller is configured to adjust a polarization state of light to meet conditions of different four-wave mixing in the medium.

According to a third aspect of the disclosure, a dynamic Q-switched rational number resonance multi-wavelength coding method is provided. The method includes: a pump source, a frequency selector, a wavelength division multiplexer, a parameter conversion medium, an output coupler, a plurality of adjustable delay devices, and a plurality of laser Q modulation devices, wherein the wavelength division multiplexer, the parameter conversion medium, the output coupler, the plurality of adjustable delay devices, and the plurality of laser Q modulation devices form a parametric oscillation cavity having a plurality of feedback paths; pump light output by the pump source enters the parametric oscillation cavity through the frequency selector and the wavelength division multiplexer in turn; the pump light generates a four-wave mixing effect in the parametric conversion medium to generate a beam of signal light having a shorter wavelength than the pump light, and a beam of idle frequency light having a longer wavelength than the pump light; the output coupler directly outputs a part of the light output from the parametric conversion medium, and outputs the other part of the light to form a plurality of paths of feedback light according to different wavelengths; each path of feedback light passes through one of the plurality of adjustable delay devices, and one of the plurality of laser Q modulation devices in turn, and returns to the wavelength division multiplexer; the plurality of laser Q modulation devices are coupled to an encoder, and the encoder is configured to control the corresponding laser Q modulation device to modulate a Q value of the oscillation cavity.

DETAILED DESCRIPTION

Figure 1:
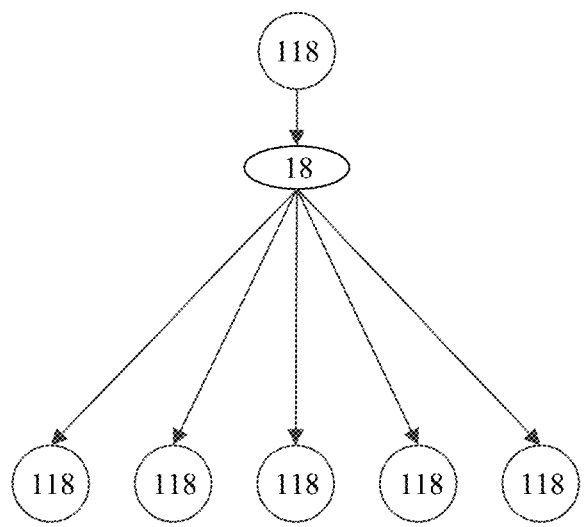
FIG. 1 is a schematic diagram illustrating a change of light spots in number before and after DOE.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

In the CARS microscopic imaging, a beam of pump light and a beam of Stokes light are employed. Wavelengths of the two beams may be changed to make frequency differences of the two beams to match different vibrational energy levels of molecules of samples, thereby exciting anti-Stokes light from the molecules of the samples. In principle, when the pump light and the Stokes light irradiate on the molecules at the same time, it may be possible to excite the anti-Stokes light from the molecules. Therefore, in space, an overlapping area of the two beams determines a resolution of CARS imaging. In theory, the smaller the overlapping area, the higher the resolution.

In related arts, the CARS microscopic imaging adopts a line-by-line scanning manner. That is, a light spot (which is formed by the overlapping area of the beam of pump light and the beam of Stokes light) scans from the leftmost end to the rightmost end of the first line of the sample, and then jumps to the second line to start scanning after the first line is scanned. This cycle goes back and forth. The scanning efficiency is low. Also, because it is impossible to break through the diffraction limit, it is difficult to distinguish biomolecules of smaller sizes, such that the resolution is not high, and there are greater limitations in medicine and related biological applications.

The disclosure aims to design a super-resolution fast-scanning CARS imaging method to remedy deficiencies of the related arts. The CARS microscopic imaging system employing a diffractive optical element (DOE) and a dispersive element, without changing physical characteristics of an original laser, may change a single light spot into a plurality of light spots, which reduces a duration of line scanning. Therefore, the X axis of a galvanometer of the system needs to deflect with a small angle, such that it may achieve scanning one line, and a duration of scanning for one image is greatly reduced. Also, taking the overlapping area of the two beams as the entry point, the resolution of the CARS microscopic imaging may be greatly improved, so that biomolecules of smaller sizes are excited to emit the anti-Stokes light, such that the image is clearer, the resolution of biological imaging is greatly improved, and details of biological samples are more abundant, realizing fast-scanning and ultra-high resolution, significantly improving the imaging rate and resolution. The method is simple, the operations are convenient, the reliability is high, the application fields are broadened, especially for providing great benefits and help on the application research and basic research in the field of spectral imaging.

The disclosure may be achieved as follows. A super-resolution fast-scanning CARS imaging method includes: emitting a beam of pump light and a beam of Stokes light; combining the beam of pump light and the beam of Stokes light to a beam of combined light; expanding/collimating the beam of combined light; the beam of combined light after the expanding/collimating entering a galvanometer, passing through a group of a scanning lens/a tube lens and being focused on a back focal plane of a microobjective and incidenting into a biological sample, such that the biological sample is excited to emit anti-Stokes light; and collecting the excited anti-Stokes light by a detector. This method is characterized by deflecting, at different angles, a single light spot focused on the microobjective through a diffractive optics group including a diffractive optical element (DOE) and a dispersive element, into a plurality of 1×N light spots to incident into the biological sample, such that the anti-Stokes light excited from smaller molecules and being condensed and filtered, is collected by the detector, thereby realizing the super-resolution fast-scanning CARS imaging method.

The diffractive optical element (DOE) is combined with dispersive elements with different parameters to adjust an overlapping area of the beam of pump light and the beam of Stokes light (i.e., an area of each of the plurality of light spots) to be small enough, to achieve the ultra-high-resolution CARS imaging.

Compared with the related arts, the disclosure, under the premise of not changing the physical characteristics of the original laser, changes the single light spot into the plurality of light spots, reducing the duration of line scanning. The X axis of the galvanometer needs to deflect with a small angle, such that it may achieve scanning one line, and a duration of scanning for one image is greatly reduced. Also, taking the overlapping area of the two beams as the entry point, the resolution of the CARS microscopic imaging may be greatly improved, so that biomolecules of smaller sizes are excited to emit the anti-Stokes light, such that details of biological samples are more abundant, realizing fast-scanning and ultra-high resolution, significantly improving the imaging rate and resolution. The method is simple, the operations are convenient, the reliability is high, the application fields are broadened, especially for providing great benefits and help on the application research and basic research in the field of spectral imaging.

The disclosure adopts the diffractive optics group including the DOE and the dispersive element to change the single light spot into the plurality of light spots. The dispersive elements with different parameters and the DOE may collaboratively and flexibly adjust the overlapping area of the pump light and the Stokes light (i.e., the area of the light spot), to make the overlapping area small enough, thereby realizing the super-resolution imaging. The DOE splits the single light spot to a plurality of (1×N) light spots, which improves the scanning rate. The system provided in the disclosure for implementing the method provided by the disclosure, may include: laser sources of 1030 nm and 790 nm; a group of positive and negative lenses for expanding and collimating a light beam; a lens for eliminating chromatic aberration of the pump light and the Stokes light (i.e., an achromatic lens); a dichroscope for reflecting the pump light of 790 nm and the Stokes light of 1030 nm and transmitting the anti-Stokes light of 640 nm; a group of a scanning lens and a tube lens for ensuring that a light beam from a galvanometer does not deviate from the microobjective and focus on a back focal plane of the tube lens, a scanning galvanometer, a filter, a PMT (photomultiplier tube) detector, and a data acquisition card for recording and saving the collected data; and other device for constituting an optical path for the CARS microscopic imaging.

The disclosure uses the beam of pump light and the beam of Stokes light to irradiate the biomolecules at the same time, so that it is possible to excite the anti-Stokes light from the biomolecules, and the overlapping area of the two beams is an effective area. The disclosure may deflect the beam of pump light and the beam of Stokes light at different angles based on the dual function of the DOE and the dispersive element, which can flexibly make the overlapping area of the two beams smaller and identify smaller biomolecules. The diffractive optics group including the DOE and the dispersive element may change the intensity distribution of the two laser beams of the pump light and the Stokes light from the original Gaussian distribution to the current distribution with a steep edge and concentrated energy in the overlapping part of the two beams, which is more likely to excite the anti-Stokes light from the samples. After using DOE, without changing the nature of the two beams, the single light spot is changed into the plurality of light spots, which greatly reduces the duration of line scanning. The X axis of the galvanometer needs to deflect with a small angle to achieve scanning one line, and a duration of scanning for one image is greatly reduced.

As follows, based on spots and intensity changes when the pump light and the Stokes light passes through the diffractive optical element (DOE) and the DOE, and by using the micro-nano structure of the lens surface to control the phase of the incident light, the laser light is modulated, such as laser beam splitting, laser sampling, and laser shaping, and further describes the disclosure in detail.

Referring to FIG. 1, the pump light and the Stokes light are combined/collimated and performed with the achromatic, and then passes through the galvanometer and enters the group of the scanning lens/the tube lens to from one spot 118, and such one spot 118 becomes a plurality of spots 118 after the beam splitting of the diffractive optical element (DOE) 18. After the beam splitting, the beams are arranged in a one-dimensional shape (1×N). A diameter and phase of each beam may be consistent with an incident beam, and the diffraction efficiency is 70%-95%. The difference in beam diameter energy is <1%. A distance between adjacent spots is calculated by the following formula (a):

$$L=d*\tan(\Phi) \tag{a}$$

where, d denotes a vertical distance from the laser to the sample surface; $\Phi$ denotes an angle between adjacent laser beams.

Figure 2:
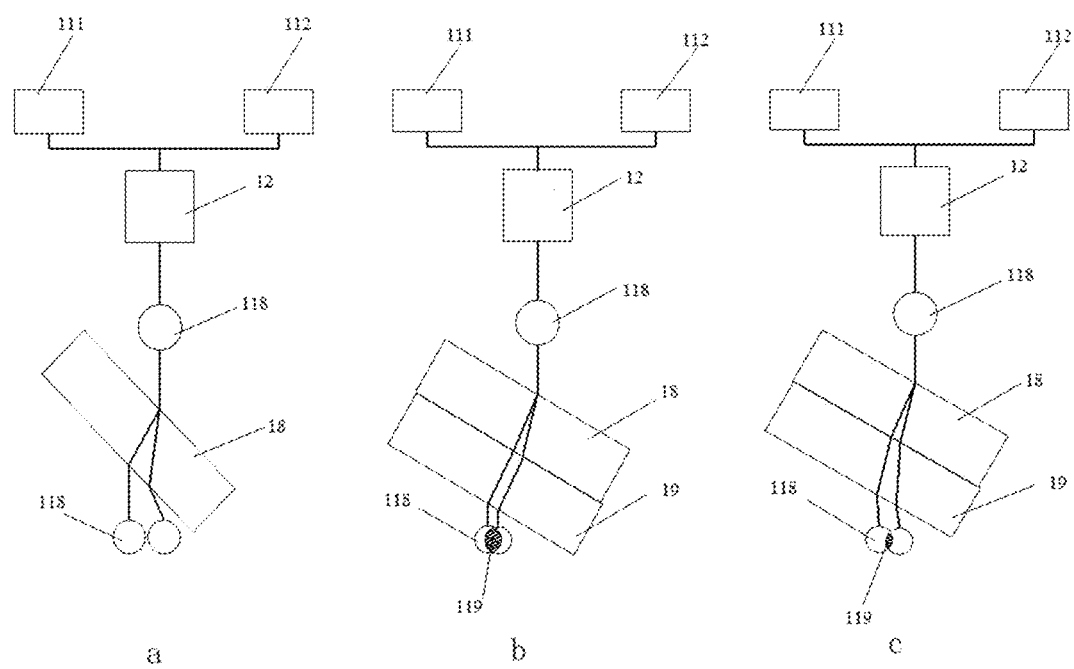
FIG. 2 is a schematic diagram illustrating a change of an overlapping area of light spots before and after DOE and a dispersive element.

Referring to FIG. 2a, the beam of pump light emitted by the 790 nm laser 111 and the beam of Stokes light emitted by the 1030 nm laser 112 are combined by the beam combiner 12 to from one light beam 118. When the one light beam 118 passes through the diffractive optical element (DOE) 18, the one light beam 118 may become the plurality of light beams 118, and the two beams of laser light of each light beam will deflect with different angles after they emit from the DOE 18 because the light of different wavelengths in the DOE 18 has different diffraction angles. Due to the large difference in the wavelengths of the two beams of laser light, the spots 118 formed by the two beams of laser light may be completely separated, that is, the overlapping area of the two beams of laser light is zero, and the condition of coherent Raman imaging cannot be met at this time.

Referring to FIG. 2b, if a dispersive element 19 is provided behind the diffractive optical element (DOE) 18, the overlapping area 119 of the spots 118 formed by the two beams of laser light becomes very large. In practical applications, the deflection effect of the DOE 18 on the pump light and the Stokes light is not flexible enough, such that the spots 18 formed by the two beams may be completely separated or the overlapping area 119 is too large, which may affect the coherent Raman imaging.

Referring to FIG. 2c, if a dispersive element 19 with appropriate parameters is provided behind the diffractive optical element (DOE) 18, which may flexibly adjust the overlapping area 119 of the spots 118 formed by the pump light and the Stokes light. The overlapping part of the two beams may be fine-tuned, to make it small enough to break through the diffraction limit to achieve super-resolution imaging. To meet the experimental requirements, it is generally assumed that the refractive index of the diffractive optical element (DOE) 18 is n1, and the refractive index of the dispersive element 19 is n2.

Figure 3:
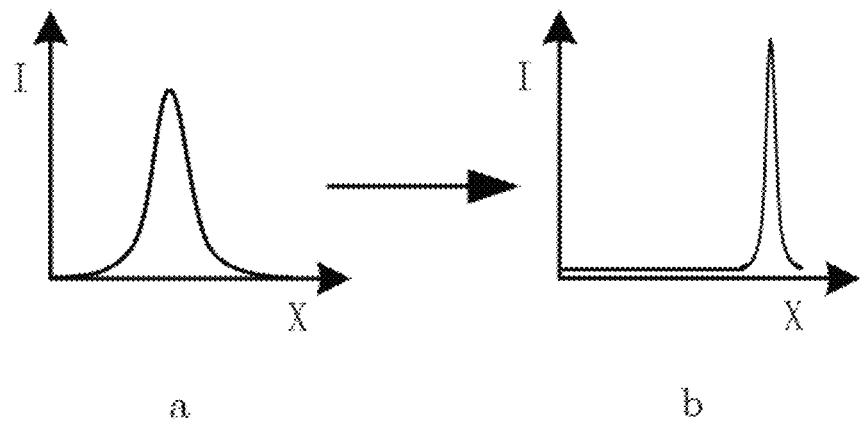
FIG. 3 is a schematic diagram illustrating a change of intensity distribution of laser light before and after DOE.

Referring to FIG. 3a, the intensity of the laser light before passing through the DOE is Gaussian.

Referring to FIG. 3b, the intensity of the laser light after passing through the DOE is a marginal distribution having a steep edge, such that the light intensity is concentrated at the overlapping part of the spots, thereby ensuring that the light intensity is enough to excite the anti-Stokes light from the sample.

Figure 4:
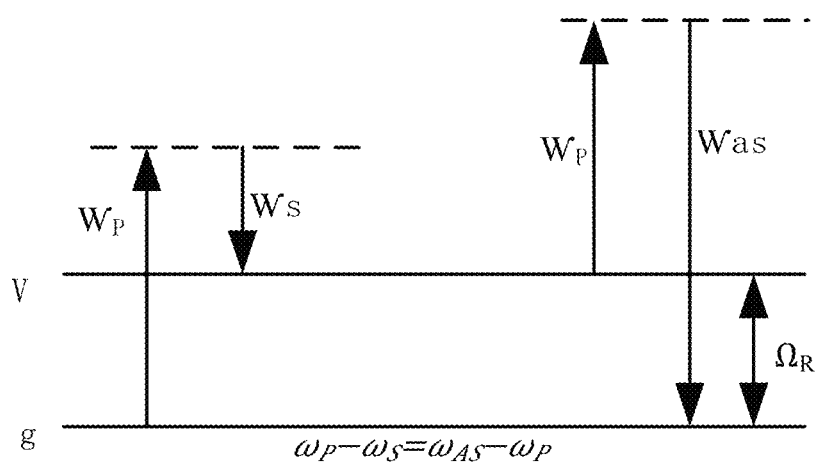
FIG. 4 is a schematic diagram of CARS microscopic imaging.

Referring to FIG. 4, the disclosure makes the frequency difference between the Stokes light and the pump light to match the molecular Raman mode to be excited based on the principle of four-wave mixing, which is different from the spontaneous Raman and other Raman scattering effects, to excite the anti-Stokes light. In this FIG., $W_p$ is the pump light, $W_s$ is the Stokes light, $W_{as}$ is the anti-Stokes light, and $\Phi_R$ is an energy level difference of the excited molecule. It can be seen from the formula of $\omega_P - \omega_S = \omega_{AS} - \omega_P$ that by adjusting the frequency difference between the Stokes light and the pump light, different Raman modes can be selected and excited, with great flexibility.

In the following, the disclosure will be described in further detail with the specific implementation and operation process of CARS imaging.

Figure 5:
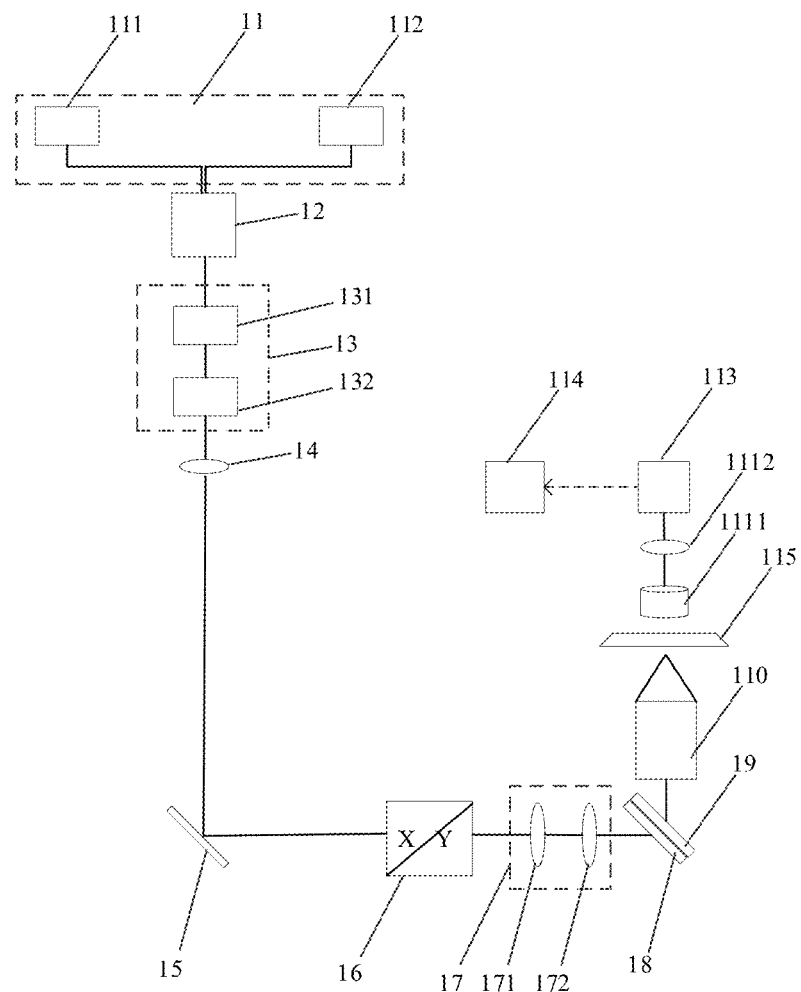
FIG. 5 is a schematic diagram of a forward CARS imaging system.

Referring to FIG. 5, a forward CARS imaging system is provided. A 1580 nm erbium-doped laser 111 and a 1030 nm ytterbium-doped laser 112 form a dual laser 11 of the system. The 1580 nm erbium-doped laser 111 undergoes a certain non-linear action to produce laser light pulse of 790 nm as the pump light. Laser light pulse of 1030 nm generated by the 1030 nm ytterbium-doped laser 112 is used as the Stokes light. The two beams of light are combined by the beam combiner 12 to form one beam. Since the laser light has a certain divergence, and an optical path of the CARS imaging system is long, even if a divergence angle of the laser light is relatively small, an area of the light spot of the laser light may become larger when the laser light is transmitted to an entrance pupil of the objective lens 110. The disclosure uses the lens group 13 including the negative lens 131 and the positive lens 132 to perform beam expansion and collimation. The focal length of the negative lens 131 is 5 mm. The focal length of the positive lens 132 is 10 mm. The beam expansion factor of the lens group 13 is f2/f1=2 times, and the diameter of the light spot after the beam expansion is changed from the original 2 mm to approximately 4 mm, and the area of the light spot is smaller than the mirror surface of the galvanometer 16, and may just fill the entrance pupil of the objective lens 110. Since the light of different wavelengths will have different dispersion and refractive indexes when passing through the lens group 13, the light of different wavelengths will have different focal points, and is compensated by the achromatic lens 14. The pump light and the Stokes light with reduced dispersion enters the X mirror surface of the galvanometer 16 through the reflecting mirror 15, and is reflected by the X mirror surface to enter the Y mirror surface and finally exits from the galvanometer 16. Since the galvanometer 16 is in continuous motion during scanning, the beam emitted from the galvanometer 16 is also in a state of continuous deflection, and then the beam may deviate from the entrance pupil of the objective lens 110. In addition, the beam may deviate from the entrance pupil of the objective lens 110 after passing through a longer optical path. The disclosure uses the group 17 of the scanning lens/the tube lens to refocus the beam to the back focal plane of the objective lens 110. The group 17 of the scanning lens/the tube lens provided behind the galvanometer 16 may ensure that the galvanometer 16 scans the beam at a larger angle and the beam may pass through the entrance pupil of the objective lens 110. The scanning plane represents the plane exiting from the galvanometer 16. The scanning plane is located at the front focus of the scanning lens 171. The rear focus of the scanning lens 171 and the front focus of the tube lens 172 are at the same position. Therefore, even if the galvanometer 16 has the relatively large deflection angle, it may ensure that a fixed focus is formed on the back focal plane of the tube lens 172. Through the continuous scanning of the galvanometer 16, a 1×N light spots quickly scans line by line on the biological sample. The X mirror surface of the galvanometer 16 only needs to deflect with a small angle to complete one-line scanning. Compared with the single light spot in the related arts, the purpose of fast-scanning may be realized truly in the disclosure. At the same time, the smaller overlapping area of the pump light and the Stokes light, and the anti-Stokes light may be excited from the smaller biomolecules, thereby distinguishing the smaller biomolecules, and realizing the super-resolution imaging.

The pump light and the Stokes light focused by the group 17 of the scanning lens/the tube lens may be split and shaped by the diffractive optical element (DOE) 18 and the dispersive element 19 and enter the biological sample on the stage 115 through the objective lens 110. The CARS signal excited from the biological sample enters the filter 1112 through the condenser 1111. The filter 1112 uses a band-pass filter with a center wavelength of 650 nm and a bandwidth of 40 nm. After filtering out other light wave signals, it is collected by a PMT detector 113. The collected CARS signal is processed by a computer to obtain the CARS image, and the CARS image is recorded and saved by the data acquisition card 114.

Figure 6:
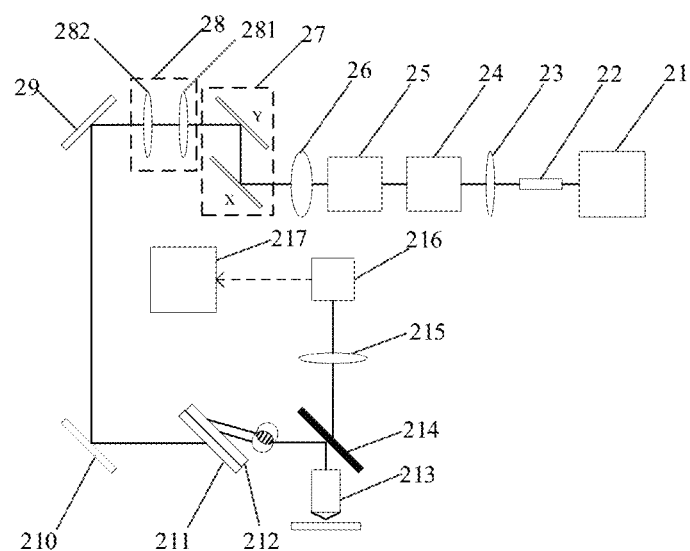
FIG. 6 is a schematic diagram of a backward CARS imaging system.

Referring to FIG. 6, a backward CARS imaging system is provided. The system may include: a 1030 nm single laser 21, a photonic crystal fiber oscillator (PCF) 22, a first filter 23, a negative lens 24, a positive lens 25, an achromatic lens 26, a galvanometer 27, a group 28 of a scanning lens/a tube lens, a diffractive optical element (DOE) 211, a dispersive element 212, an objective lens 213, a dichroic mirror 214, a second filter 215 and a detector 216. The diffractive optics group including the diffractive optical element (DOE) 211 and the dispersive element 212 may make the beam focused on the objective lens 213 to deflect at different angles and then to enter the biological sample to excite the anti-Stokes light from smaller biomolecules. The anti-Stokes light passes through the dichroic mirror 214 and the second filter 215, and is collected by the detector 216 and recorded and saved by the data acquisition card 217. The diffractive optical element (DOE) 211 is combined with the dispersive elements 212 of different parameters to make the overlapping area the two light spots of the pump light and the Stokes light small enough to achieve ultra-high-resolution coherent Raman scattering imaging.

The light of 1030 nm generated by the 1030 nm single laser 21 passes into the photonic crystal fiber oscillator (PCF) 22. Four-wave mixing occurs in the PCF to generate the pump light of 790 nm, the idle-frequency light of 1479 nm and the Stokes light. After the filter 23, the idle-frequency light of 1479 nm is filtered out. The pump light and the Stokes light are expanded and collimated by the negative lens 24, the positive lens 25 and the achromatic lens 26 and then enters the X mirror surface of the galvanometer 27, and is reflected from the X mirror surface to enter the Y mirror surface. The laser light emitted from the galvanometer 27 passes through the group 28 of the canning lens/the tube lens for focusing and then passes through the first mirror 29 and the second mirror 210 and then enters the diffractive optical element (DOE) 211 and the dispersive element 212.

The focal length of the negative lens 24 is 5 mm. The focal length of the positive lens 25 is 10 mm. The beam expansion factor is f2/f1=2 times. The diameter of the light spot after beam expansion changes from the original 2 mm to approximately 4 mm, and the area of the light spot is smaller than the mirror surface of the galvanometer 527 and can just fill the entrance pupil of the objective lens 213. Since the light of different wavelengths will have different dispersion and refractive indexes when passing through the group of the positive lens/the negative lens, the light of different wavelengths will have different focal points, and is compensated by the achromatic lens 26. The pump light and the Stokes light with reduced dispersion enters the X mirror surface of the galvanometer 27 and is reflected by the X mirror surface to enter the Y mirror surface and finally exits from the galvanometer 27. Since the galvanometer 27 is in continuous motion during scanning, the beam emitted from the galvanometer 27 is also in a state of continuous deflection, and then the beam may deviate from the entrance pupil of the objective lens 213. In addition, the beam may deviate from the entrance pupil of the objective lens 213 after passing through a longer optical path. The group 28 of the scanning lens/the tube lens is employed to refocus the light beam to the back focal plane of the objective lens 213. The group 28 of the scanning lens/the tube lens provided behind the galvanometer 27 may ensure that the galvanometer 27 scans with the beam at a larger angle and the beam may pass through the entrance pupil of the objective lens 213. The scanning plane exiting from the galvanometer 27 is located at the front focus of the scanning lens 281. The rear focus of the scanning lens 281 and the front focus of the tube lens 282 are at the same position. Therefore, even if the galvanometer 27 has the relatively large deflection angle, it may ensure that a fixed focus is formed on the back focal plane of the tube lens 282. The pump light and the Stokes light focused by the group 28 of the scanning lens/the tube lens may be split and shaped by the diffractive optical element (DOE) 211 and the dispersive element 212 and enter the biological sample on the stage. The CARS signal excited from the small biomolecules may enter the second filter 215 through the dichroic mirror 214. The second filter 215 uses a band-pass filter with a center wavelength of 650 nm and a bandwidth of 40 nm. After filtering out other light wave signals, it is collected by a detector 216. The CARS signal collected by the detector 216 is processed by a computer to obtain the CARS image, and the CARS image is recorded and saved by the data acquisition card 217. Through the continuous scanning of the galvanometer 27, 1×N light spots may quickly scan line by line on the biological sample. The X mirror surface of the galvanometer 27 only needs to deflect with a small angle to complete one-line scanning. Compared with the single light spot in the related arts, the purpose of fast-scanning may be realized truly. At the same time, the diffractive optical element (DOE) 211 may be combined with the dispersive elements 212 with different parameters to make the overlapping area of the two spots of the pump light and the Stokes light to small enough, such that the anti-Stokes light may be excited from the smaller biomolecules, thereby distinguishing the smaller biomolecules, and realizing the super-resolution imaging.

After the pump light and the Stokes light pass through the diffractive optical element (DOE) 211 and the dispersive element 212, the laser beam splitting and the ideal overlapping area of light spots have been achieved; the boundary wavelength of the dichroic mirror 214 is 655 nm. When the light beam and the dichroic mirror 214 are at a 45-degree angle, if the wavelength is greater than 668 nm, the reflectivity of the light reaches 98%, which is almost completely inverted, and belongs to the reflective area; if the wavelength is less than 642 nm, the transmittance of the light reaches 96%, which is the transparent crossing zone. The pump light and the Stokes light are reflected by the dichroic mirror 214, pass through the objective lens 213 and finally irradiate the sample. The excited anti-Stokes light of 640 nm can pass through the dichroic mirror 214 and pass through the second filter 215 and be collected by the detector 216. The signal is sent to the data collection card 217 for storage, and the collected signal is processed by a computer to obtain the CARS image.

In the CARS microscopic imaging, a laser light source is necessary.

However, a limitation of realizing a multi-wavelength tunable light source lies in a method of realizing a plurality of wavelengths tunable. It is easy to cause a lock of a mode-locking laser by adjusting the plurality of wavelengths directly in an oscillator. Also, a range of tunable wavelengths is limited by a gain bandwidth of a gain medium, which is not large. The wavelength tunable elements such as a F-P (fabry-perot) cavity, a dielectric thin film filter, an acousto-optic filter, are added into a laser resonator in the early realization of a multi-wavelength tunable laser. There spatial free tunable elements are generally non-fiber-optic structures with large insertion loss, which reduces the efficiency, integration and compactness of the laser. Recently, the spatial tuners may be replaced by all-fiber-optic filters, which can effectively reduce loss and be more conducive to integration. However, a cost of tunable fiber-optic gratings represented by long-period fiber-optic gratings is relatively high, and is limited by the strain characteristics of the fiber-optic grating itself, and the range of tunable wavelengths is relatively small.

The disclosure aims to provide a multi-wavelength tunable synchronous light source with acousto-optical electromechanical linkage to remedy deficiencies of the related arts, which has a compact structure, stable performance, rich wavelengths, continuous tuning, and can simultaneously excite a plurality of energy photons.

The disclosure adopts the following technical solutions.

A multi-wavelength tunable synchronous light source with acousto-optic electromechanical linkage is characterized in that the light source is provided, along an optical path, sequentially with a reflective element, a dispersive element, an first optical switch, a gain medium, a first output coupler, a mode-locking element, and a pump source for effecting on the gain medium independently. The first output coupler outputs seed light, and the seed light passes through a wavelength division multiplexer, a second output coupler, a polarization controller and a second optical switch in turn along the optical path. The seed light is divided into two branches by the second optical switch. A first branch enters a first parametric medium and is divided into two delay loops through a third optical switch. One of the two delay loops passes through a first delay device, another of the two delay loops passes through a second delay device, and the two delay loops are combined by a first beam combiner and returns to the wavelength division multiplexer, such that a loop cavity is formed. A second branch enters a second parametric medium and is divided into two delay loops through a fourth optical switch. One of the two delay loops passes through a third delay device, another of the two delay loops passes through a fourth delay device, and the two delay loops are combined by a second beam combiner and returns to the wavelength division multiplexer, such that another loop cavity is formed.

The reflective element, the dispersive element, the first optical switch, the gain medium, the mode-locking element, the first output coupler, and the pump source form a main resonant cavity for outputting seed light pulse. The light passes through the dispersive element to generate dispersion, and is combined with the first optical switch to achieve continuous small-scale tuning in the cavity. The gain medium is used as a working medium to provide energy level transition. The pump source supplies energy to the working medium, such that a number of particles may be inverted and stimulated radiation is generated. The added mode-locking element may cause a laser to generate ultra-short pulses, and finally the first output coupler outputs the seed light.

The wavelength division multiplexer is configured to converge a plurality of optical paths into one optical path. The seed light generated by the main resonant cavity passes through the wavelength division multiplexer and forms a loop with the second output coupler, the polarization controller, the second optical switch, the first parametric medium, the third optical switch, the first delay device, and the first beam combiner; also forms another loop with the second output coupler, the polarization controller, the second optical switch, the first parametric medium, the third optical switch, the second delay device, and the first beam combiner; also forms still another loop with the second output coupler, the polarization controller, the second optical switch, the second parametric medium, the fourth optical switch, the third delay device, and the second beam combiner; and also forms yet a final loop with the second output coupler, the polarization controller, the second optical switch, the second parametric medium, the fourth optical switch, the fourth delay device, and the second beam combiner, such that four optical loops are formed.

The second output coupler is configured to form loops of parametric resonant cavities and realize multi-wavelength tunable pulse output.

The polarization controller is configured to adjust a polarization state of light to meet conditions of different four-wave mixing in the gain medium.

The second optical switch is configured to form different optical paths, and different parametric resonant cavities may be switched by controlling the second optical switch.

On the two branches divided by the second optical switch, there are the first parametric medium and the second parametric medium, both of which are solid non-linear media and expand spectrums by non-linear effects for the light.

The third optical switch and the fourth optical switch are configured to switch among different delay devices to form four loops.

In the four loops formed by the third optical switch and the fourth optical switch, the first delay device, the second delay device, the third delay device, and the fourth delay device are provided respectively, and are configured to realize optical parameter amplification and narrow filtering. By moving a position of a mechanical translation stage in the delay device, a corresponding cavity length may be changed, to achieve continuous tuning output of optical pulses.

The first beam combiner and the second beam combiner are configured to combine the optical paths and form a closed loop with the wavelength division multiplexer.

The first optical switch, the second optical switch, the third optical switch, and the fourth optical switch may be mechanical optical switches, acousto-optic switches or electro-optic switches, which can be selected according to different requirements. Adding optical switches to the optical path can form multiple optical paths. Using optical switches to switch among different optical paths can output pulses of different wavelengths.

The first parametric medium and the second parametric medium are solid non-linear media such as lithium niobate crystals or photonic crystal fibers. Using their nonlinear characteristics, a non-linear effect occurs with the input seed pulse, thereby expanding the spectrums; and an optical path switch is realized by combining with the optical switches to realize the output of the multi-wavelength synchronous light source.

The first delay device, the second delay device, the third delay device, and the fourth delay device adopt different structures to match the corresponding lengths; a length of the resonant cavity is changed by moving a position of the delay device; and the delay devices are configured to realize optical parameter amplification and narrow filtering, to achieve a continuous tuning output of the optical pulses.

The disclosure may realize the switching among the plurality of optical paths freely and quickly by using flexibly optical switches (such as mechanical optical switches) in the resonant cavity. In the optical-fiber optical paths, optical-fiber Bragg gratings of different types may be used in different optical paths, to realize a small range of fixed-point tuning wavelengths. Acousto-optic switches can be used to achieve multi-wavelength tuning. The refractive index of the medium periodically changes due to the effect of acoustic waves, forming an optic-like "phase grating", where the grating spacing is equal to the wavelength acoustic of acoustic waves. When light waves pass through the medium, diffraction of light may occur. The intensity, frequency, direction, etc. of the diffracted light may be changed by controlling the ultrasonic field, and a grating can be added after an acousto-optic modulation crystal to achieve continuous tuning of the wavelengths. The conversion of the optical paths may be realized by using the electro-optic switches. The refractive index of the material and the phase of the light may be changed under the action of the electric field by using the electro-optic effect or the electrical absorption effect of the crystalline material, the light intensity may be changed or the optical path may be changed by using the interference or polarization of light, such that different optical paths may be switched and different resonant cavity loops may be formed to extend achievable wavelengths.

The disclosure may realize resonances of various optical paths by combining with various optical switches, thereby extending the wavelength band of the output light source of the entire resonant cavity. The disclosure may realize the conversion to lower or higher frequency light by combining with highly non-linear optical fibers because the limitation of the spectrum band of the gain medium may be broken based on the non-linear effects such as four-wave mixing generated in the highly non-linear optical fibers. It may be controlled by the optical switches, such that there is a section of gain optical fiber on each optical path, and it may realize a plurality of color synchronous lasers with different wavelengths, different gain coefficients and different output powers by flexibly choosing the type of the gain optical fiber (such as ytterbium-doped, bait-doped, thulium-doped, holmium-doped and other elements of the optical fiber), the length of the gain optical fiber and a doping concentration of the gain optical fiber. At the same time, the non-shared structure of the gain optical fiber can also suppress the adverse non-linear effects such as gain narrowing, amplified spontaneous emission, and gain competition, and improve the stability of the output power. At the same time, the disclosure, by combining with the delay devices amplifying and narrow the optical parameters to achieve continuous tuning.

The beneficial effects of the disclosure may be as follows.

1. The disclosure adopts an integrated structure and uses optical switches, to overcome the limitation that multiple lasers are required to achieve different wavelengths in actual applications. The disclosure may directly output laser pulses with a wide range of multi-wavelengths tunable.

2. The disclosure uses optical switches flexibly, combines with the cavity structure of the resonant cavity, and utilizes the advantages of various optical switches to form multiple optical paths, forming a light source with compact structure, low loss, and strong maneuverability.

3. The disclosure adopts an all-optical-fiber structure, which can greatly reduce the volume of the laser light source, facilitate the integration of the entire optical paths into a small space, improve stability, and is suitable for complex environments other than ultra-clean laboratories.

4. The disclosure may achieve precise synchronization of multi-channel ultra-short pulses based on the non-linear ultra-fast modulation in the gain medium in the resonant cavity. The response speed of non-linear effects is very fast, reaching picosecond or even femtosecond levels, which greatly improves the synchronization accuracy and realizes high-precision synchronization pulses with several orders of magnitude higher than the synchronization methods of the previous electronic circuits.

5. The disclosure may realize the conversion of a wide range of frequency pulses by using the non-linear effects that can be generated in different types of gain media used on different optical paths, and achieve the selection of multiple ranges of wavelength pulses in combination with optical switches for switching among different resonance branches.

6. The operation mode of the optical switch adopted in the disclosure is to switch different optical switches to achieve different optical path resonances, and can operate independently of each other without interference from other branches. Therefore, the long-term stable operation of each branch resonance cavity can be guaranteed, thereby improving the stability of the overall system.

7. The disclosure combines the cavity structures of the optical parametric oscillation cavities and the delay devices to obtain a continuously tuned spectral output.

8. The gain media of branches in the resonant cavity of the disclosure are independent of each other. By using different types of gain media, multi-channel pulse laser output with multiple bands and multiple parameters can be realized.

Figure 7:
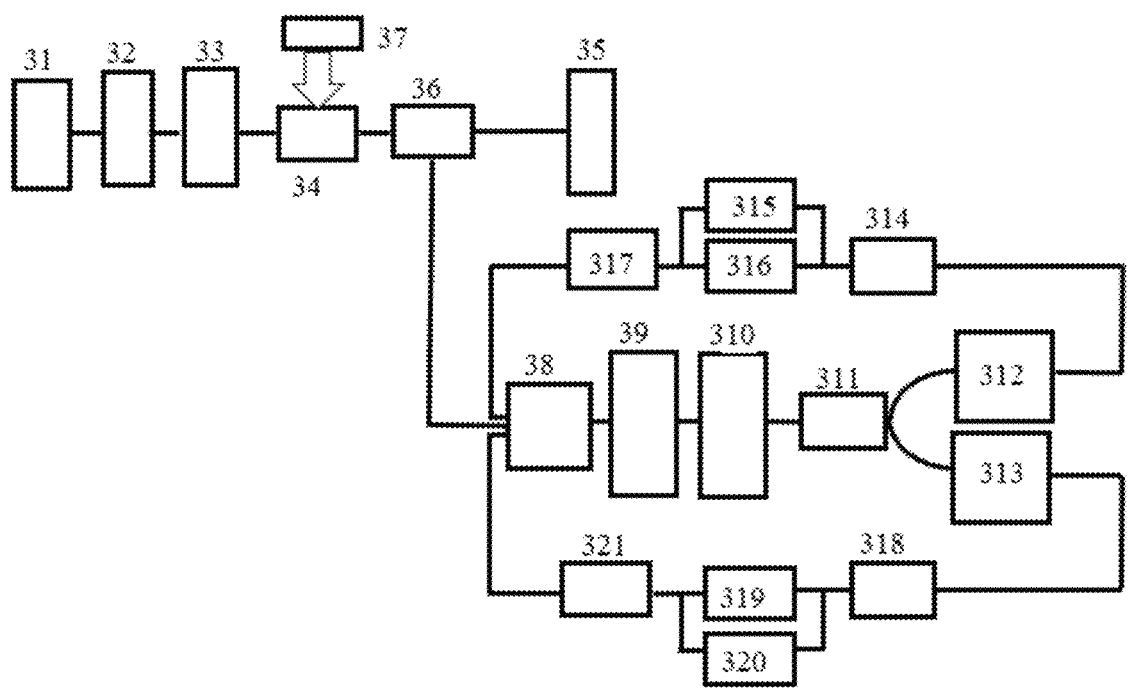
FIG. 7 is a schematic diagram of a multi-wavelength tunable synchronous light source with acousto-optic electromechanical linkage.

FIG. 7 is a schematic diagram of a multi-wavelength tunable synchronous light source with acousto-optic electromechanical linkage.

Referring to FIG. 7, the light source includes: a reflective element 31, a dispersive element 32, an first optical switch 33, a gain medium 34, a mode-locking element 35, a first output coupler 36, a pump source 37, a wavelength division multiplexer 38, a second output coupler 39, a polarization controller 310, a second optical switch 311, a third optical switch 314 and a fourth optical switch 318 of different types, a first parametric medium 312 and a second parametric medium 313 of different types, a 2×1 beam combiner 317, a 2×1 beam combiner 321, and delay devices in different branches (i.e., a first delay device 315, a second delay device 316, a third delay device 319 and a fourth delay device 320).

The pump-light resonant cavity is a standing wave resonant cavity including two elements with reflective properties, and the titanium sapphire crystal or the optical fiber doped with rare ions is used as the gain medium, and the pump source is added, to realize the stimulated radiation in the cavity, to produce light of a specific wavelength. The optical path can be changed by adding an optical switch in the cavity. For example, mechanical optical switches combined with gratings are used to achieve fixed-point tuning of light pulses of different wavelengths; or by adding dispersive elements, the light in the cavity is dispersed and separated into light of different wavelengths, and by combining with optical switches, it may achieve continuous tuning of seed light of different wavelengths. The mode-locked device in the cavity is to assist the laser to be self-mode-locked, to achieve a series of continuous and stable pulses. The mode-locked device commonly used may include such as a saturable absorber.

After a stable pulse is formed in the cavity, the stable pulse is output by the first output coupler 36 as seed light. The seed light passes through the wavelength division multiplexer 38, the second output coupler 39, the polarization controller 310 and the second optical switch 311 (such as the electro-optic switch, or the acousto-optic switch). Then the optical path is divided into two branches, and the two branches pass through different media respectively, such as the first parametric medium 312 and the second parametric medium 313. The branch passing through the first parametric medium 312 may pass through the third optical switch 314 and be divided into two subbranches; the two subbranches pass through the first delay device 315 and the second delay device 316 respectively, and then pass through the beam combiner 317 and the wavelength division multiplexer 38 to form the loops. Another branch passing through the second parametric medium 313 may pass through the fourth optical switch 318 and be divided into two sub-branches; the two subbranches pass through the third delay device 319 and the fourth delay device 320 respectively, and then pass through by the beam combiner 321 and the wavelength division multiplexer 38 to form the loops. Finally, three optical switches (the second optical switch, the third optical switch, and the fourth optical switch) may be used to form different parametric oscillation loop cavities.

The polarization controller 310 may be added according to the experimental scheme. The polarization controller 310 aims to module the polarization state of the seed light input in the parametric resonant cavity, such that the seed light may meet different conditions required when the seed light is combined with the gain medium such as the photonic crystal fiber to realize scalar four-wave mixing and vector four-wave mixing. Different types of parametric media, such as lithium niobate crystals or photonic crystal fibers, may be used on different branches. The spectrum expansion may be realized based on the strong non-linear properties of these media. By combining with the characteristics of the optical switches, different delay devices are added to different loops to achieve the effect of optical parameter amplification and narrowing filtering. Finally, the 2×1 beam combiner and the wavelength division multiplexer are used to form the parametric oscillator with four loops.

All of the above devices and their connections can be built with optical fiber paths. The polarization-maintaining optical fibers can be used.

The optical switches may be mechanical optical switches, acousto-optic switches or electro-optic switches. The optical path is changed by adjusting the optical switches to form resonance of different optical paths.

The dispersive element 32 may be a triangular prism to realize the dispersion of light and separate light of different wavelengths.

The mode-locking element 35 may be a saturable absorber, to realize the self-mode-locked of the laser.

The parametric medium may be the highly non-linear medium, such as the lithium niobate crystal or the photonic crystal fiber. The frequency range of light may be extended by utilizing the non-linear effect of light in the medium. At the same time, by combining with the delay device, multi-wavelength tuning may be realized.

The second output coupler 9 may be an optical fiber coupler with an output ratio of 1:9 or 5:95, or a coupled formed by a coated lens coated with a material that allows a light reflectance of 5% and a transmittance of 95%.

The polarization controller 310 may be a half-wave plate, and by rotating the wave plate, the polarization state of the light is changed.

The delay device may use a single-mode optical fiber and an electric translation stage realize the function of optical parameter amplification and narrowing filtering. By moving the translation stage, the continuous tuning output of optical pulses can be realized.

Figure 8:
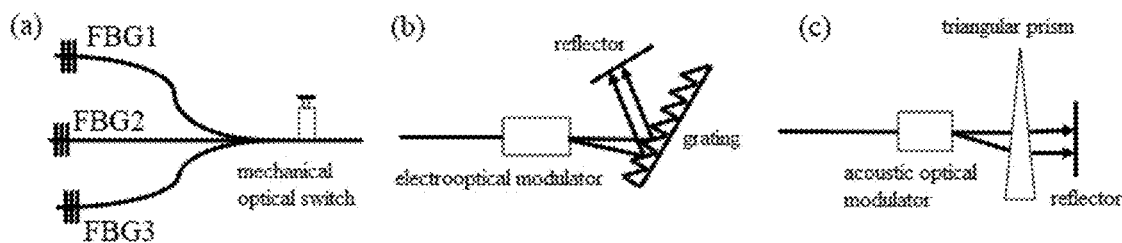
FIG. 8 is a schematic diagram of various types of optical switches.

FIG. 8 is a schematic diagram of various types of optical switches. In FIG. 8a, a mechanical optical switch may be used in combination with optical-fiber Bragg gratings in the optical fiber optical path. The mechanical optical switch may be rotated to change the optical path to be combined with the gratings on different branches to achieve fixed wavelength switching. Or, in FIG. 8b, an electro-optic switch may be used. The electro-optic effect or electro-absorption effect of the dielectric material may be used to change the refractive index of the material and the phase of the light under the action of the electric field, and then the interference or polarization of light may be used make the light intensity abrupt or the optical path change, and then by combining the grating, continuous tuning may be achieved, and by adding a reflector behind, it may make the light oscillate back and forth in the cavity. Or, in FIG. 8c, an acousto-optic switch may be used. The acousto-optic effect of the material may be used to cause mechanical strain on the material and cause periodic changes in the refractive index of the material to form a Bragg grating that diffracts the input light and then allows the output light to pass through the triangular prism. The light passing through the triangular prism may have a dispersion effect, which broadens the optical pulse, and then uses a reflective device to form an oscillation cavity. A variety of optical switches can be selected according to actual needs. The acousto-optic switches can realize the continuous adjustment. The electro-optic switches can achieve high-speed control. The mechanical switches can achieve low-loss requirements.

Figure 9:
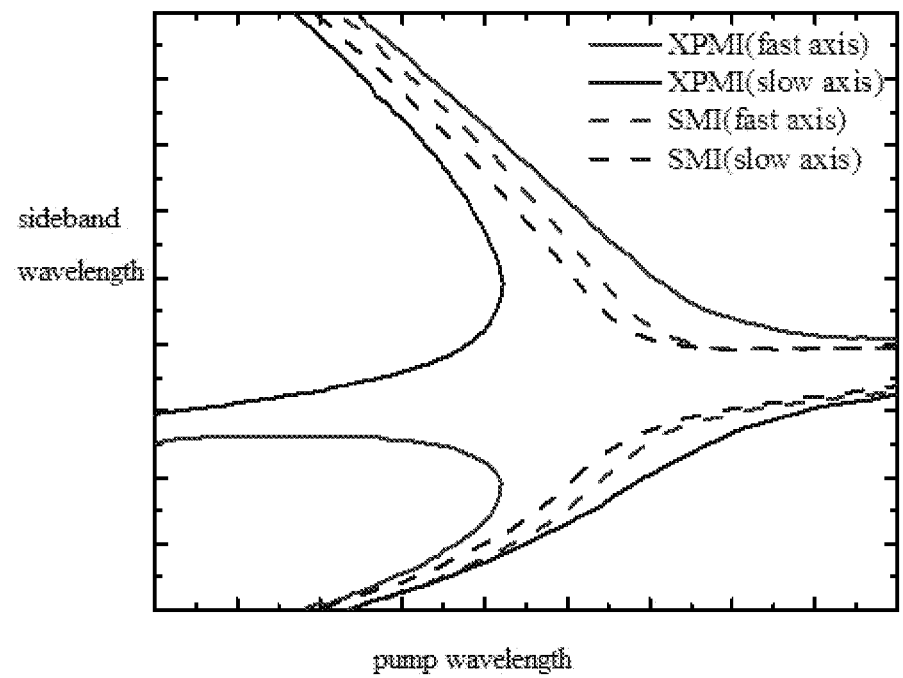
FIG. 9 is a schematic diagram of non-linear effects generated by using highly non-linear optical fibers.

FIG. 9 is a schematic diagram of non-linear effects generated by using highly non-linear optical fibers. The optical non-linear effects such as four-wave mixing and self-phase modulation may generate signal light with a fixed frequency difference, thereby providing ideas for spectrum expansion. The four-wave mixing, as a special non-linear effect of light, may generate a fourth photon through the three photons working together in the optical fiber to achieve frequency conversion. For example, with a photonic crystal fiber, the angle between the polarization angle of the seed light and the fast and slow axes of the optical fiber may be controlled to obtain the four-wave mixing effect of different conversion processes, such that the spectrum can be expanded to a greater extent. When a fixed wavelength of seed light passes through the photonic crystal fiber, and its incident light is parallel to the fast or slow axis of the optical fiber, the scalar four-wave mixing will occur. At this time, two types of photons will be generated as signal light and idle frequency light. When the angle between the incident light and the fast or slow axis of the photonic crystal fiber is 45°, the cross-phase modulation instability will occur and two types of photons with different frequencies will be generated. The phase matching conditions show that different incident pump light has different four-wave mixing effects, resulting in different wavelengths of signal light and idle frequency light. Moreover, when the wavelength of the pump light is within a certain range, five sidebands can be generated in the photonic crystal fiber at the same time, two of which come from the scalar four-wave mixing and three from unstable cross-phase modulation, that is, vector four-wave mixing. The gain optical fibers with different parameters may be used to obtain signal light in different bands.

Figure 10:
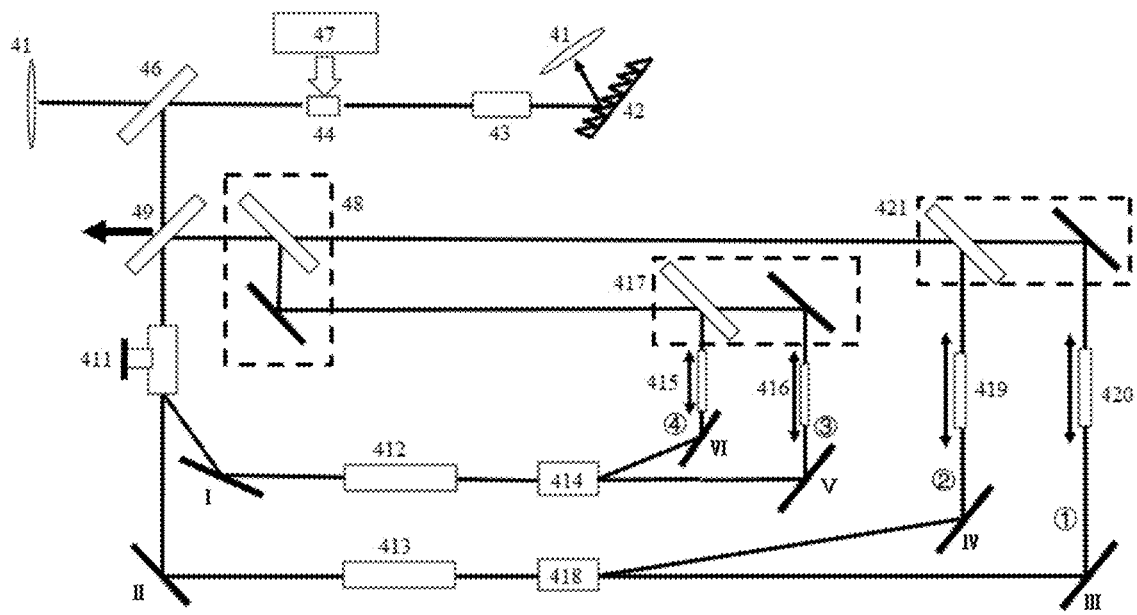
FIG. 10 is a schematic diagram of a spatial structure of the disclosure.

FIG. 10 is a schematic diagram of a spatial structure of the disclosure. Two reflectors with a reflectivity of 98% may be used as reflective elements 41 to form a standing wave resonant cavity. The solid non-linear medium may be used as the gain medium 44. The pump source 47 is provided by the outside world, such that the gain medium 44 may be stimulated to generate the radiation to generate photons and the photons may oscillate in the resonant cavity. The first optical switch 43 is added in the main cavity. The output angle of light is deflected by adjusting the switch. The multi-wavelength light may be generated through the dispersion effect of the grating 42. By adjusting the optical path, the light pulse of a specific wavelength is reflected by the reflector to oscillate back and forth in the cavity. When the gain and loss are balanced, the dichroic mirror is used as the output coupler 46 to form a stable output. After the optical pulse output from the main resonant cavity passes through the dichroic mirror as the output coupler 49, it passes through the second optical switch 411. The two optical paths can be switched by adjusting the switch, which are formed by the first mirror I and the second mirror II respectively. The different types of the first parametric medium 412 and the second parametric medium 413 may be used in the two optical paths respectively. The seed light passes through the gain medium. Due to the non-linear effect of light in the medium, the spectrum is broadened and more spectrum is realized. The two optical paths passing through different parametric media, then pass through the third optical switch 414 and the fourth optical switch 418 respectively. The optical path switching may be realized by the optical switches, and then four branches may be formed by multiple reflectors and dichroic mirrors with specific parameters. The third mirror III forms a branch ①. The fourth mirror IV forms a branch ②. A dichroic mirror and a reflector are used as the beam combiner 421. The dichroic mirror may realize the transmission of the light in the band generated by the resonant cavity of the branch ①, and the reflection of the light in the band generated by the resonant cavity of the branch ②. The fifth mirror V forms a branch ③. The sixth mirror VI forms a branch ④. Another dichroic mirror and another reflector are used as the beam combiner 417. The other dichroic mirror may realize the transmission of the light in the band generated by the resonant cavity of the branch ③ and the reflection of the light in the band generated by the resonant cavity of the branch ④. Different delay elements 415, 416, 419, and 420 are added as delay devices in the four loops respectively to achieve the effect of amplifying and narrowing the optical parameters. By adjusting the position of the delay device, a multi-wavelength pulse can be tuned. The complete closed loop is formed by the reflection mirror and the dichroic mirror as the wavelength division multiplexer 48 and finally the multi-wavelength tunable pulse is output through the dichroic mirror as the output coupler 49.

Figure 11:
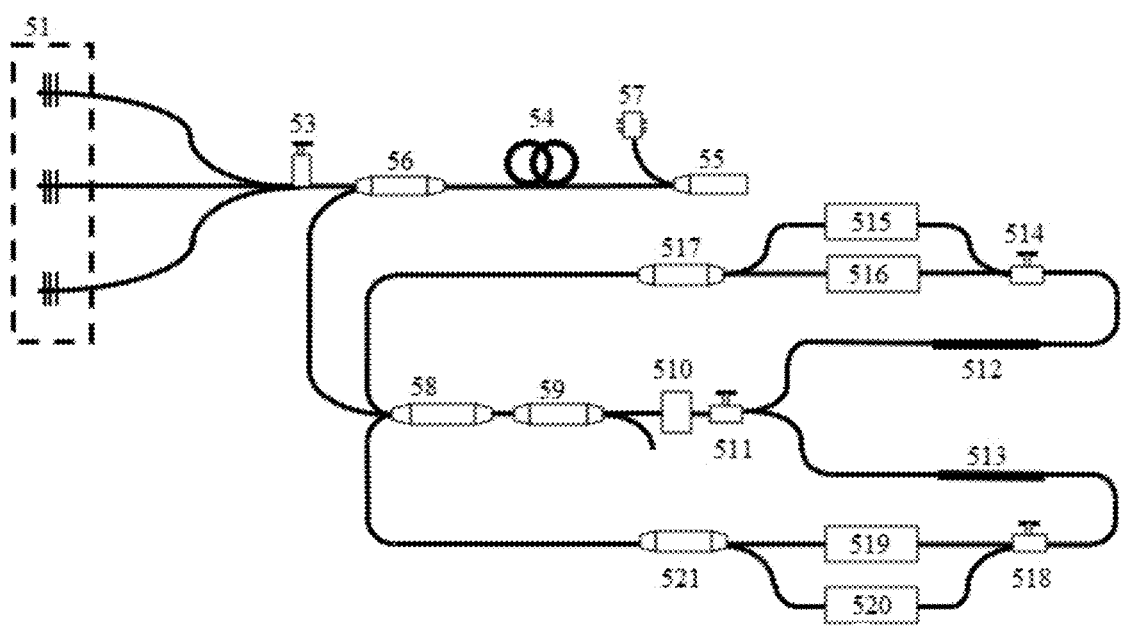
FIG. 11 is a schematic diagram of a structure of the disclosure based on optical fiber devices.

FIG. 11 is a schematic diagram of a structure of the disclosure based on optical fiber devices. An optical-fiber Bragg grating with a plurality of center wavelengths may be used as the reflective element. At the same time, the optical-fiber Bragg grating may select a pulse of a specific center wavelength such that a pulse of a stable wavelength is output from the cavity. The first optical switch 53 may be included in the main optical path. The optical paths may be switched by the optical switch and then be combined with different optical-fiber Bragg gratings to achieve the function of fixed-point wavelength adjustment. The gain optical fiber doped with Yb is used as the gain medium 54. The saturable absorption mirror is also used as the mode-locking element 55. The mode-locking element 55 forms a resonant cavity together with the optical-fiber Bragg grating. The photo-diode is used as the pump source 57. The optical fiber coupler is used as the output coupler 56 to output a stable seed pulse. The seed pulse passes through the wavelength division multiplexer 58, the output coupler 59, and the polarization controller 10, and then may be divided into two branches by the second optical switch 511. The two branches are respectively used with parametric media 512, 513 of different parameters. The photonic crystal fiber (PCF) may be used as the medium to achieve spectral broadening. The polarization modulator 510 is used to tune the polarization of the seed light input into the photonic crystal fiber, such that the angle between the seed light and the fast axis or the slow axis of the photonic crystal fiber can be changed to achieve scalar four-wave mixing or vector four-wave mixing, resulting in a wider adjustable spectral range. Later, the third optical switch 514 and the fourth optical switch 518 may be used to form two branches respectively. The delay devices 515, 516, 519, and 520 are added to each branch respectively. The delay device may use a single-mode polarization-maintaining optical fiber and an optical fiber translation stage. By adjusting the translation stage, the narrowing of optical parameters and the amplification of the parametric oscillator are realized. A total of four loops are formed. Finally, the beam combiners 517, 521 are used to form a closed cavity. The devices in the optical path all use optical fiber structures. Relying on the optical fibers to connect the optical path, the integration is higher. The fusion of the optical fibers may make the optical path loss smaller. The core idea of the structure is to rely on the optical switches to achieve the purpose of switching different resonant cavities. The output of the multi-wavelength tunable synchronous light source may be realized by combining the non-linear effects.

Figure 12:
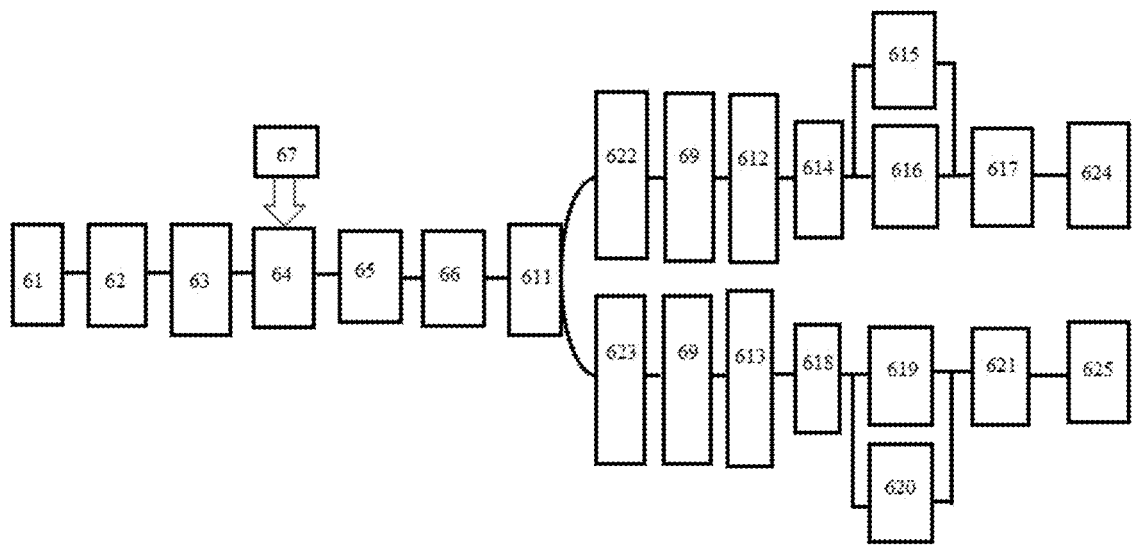
FIG. 12 is a schematic diagram of a structure according to another embodiment of the disclosure.

FIG. 12 is a schematic diagram of a structure according to another embodiment of the disclosure. FIG. 12 shows a schematic diagram of a cavity type of a parametric resonant cavity using a standing wave cavity, which proves the diversity and expandability of the disclosure. The reflective element 61, the dispersive element 62, the first optical switch 63, the gain medium 64, the mode-locking element 65 and the pump source 67 form a laser. The output coupler 66 is used to output the seed light. The seed light passes through the second optical switch 611 and is divided into two branches. The parametric resonant cavity is mainly a standing wave cavity structure including transflective elements 622, 623 that may transmit the seed light and reflect signal light in the resonant cavity and reflective elements 624, 625. The parametric resonant cavity includes an output coupler 69, which may output a pulse of a certain proportion while maintaining the oscillation of the resonant cavity. There are also parametric media 612, 613 in the two branches. Different first parametric medium and second parametric medium can be used on the two branches, and their different non-linear effects are used to achieve spectral expansion. Then by the third optical switch 614 and the fourth optical switch 618 to switch among the different delay devices 615, 616, 619, 620, and by beam combiners 617, 621, the delay devices can be combined back into the same parametric resonance cavity. The entire device mainly relies on various types of optical switches 63, 611, 614, 618 to change the optical paths to achieve the switching of different optical paths, and then combine the parametric media 612, 613 of different parameters to use their non-linear effects to achieve the purpose of expanding the output spectrum. Multi-wavelength tunable pulses are output through the output coupler 69 to provide a multi-wavelength tunable synchronous light source based on acousto-optic electromechanical linkage.

Since the performance of the CARS system depends largely on the characteristics of its light source, more and more efforts are devoted to the development of ultrafast lasers with time synchronization, spatial overlapping and adjustable wavelength.

The optical parametric oscillator (OPO) has the advantages of robustness, compactness and low loss, and can output ultrafast laser light pulse with time synchronization, spatial overlapping and adjustable wavelength, which meets the requirements of the CARS microscopic imaging for light sources. Therefore, in recent years, it has become a research hotspot in this field that the OPO is used as the light source of the CARS microscopic imaging.

The OPO has become a widely-used light source in the CARS microscopic imaging. However, with the development of the CARS microscopic imaging, it has new requirements for the light source. Based on research, it was found that, for biological samples with a lower density in the CARS microscopic imaging, ultra-fast laser light pulses with a high repetition rate (20-80 MHz) are suitable; for dense samples such as marrow that is usually used to study the transmission of action potentials and nerve impulses, laser light pulses with a low repetition rate of a few MHz may be more suitable due to reduced light damage. When the CARS microscope imaging is performed on the multiple substances at the same time, it is required that the light source of the CARS microscope imaging can simultaneously provide multiple ultrafast laser light with time synchronization and spatial overlapping. Although a super-continuum spectrum source satisfies the requirements of simultaneous CARS imaging of multiple substances, it lacks spectral energy density and peak power and is not suitable for rapid CARS imaging. Therefore, it requires to make appropriate improvements on the OPO to meet the light source requirements for simultaneous CARS imaging for multiple substances.

The disclosure aims to provide a dynamic Q modulation rational resonance multi-wavelength coding apparatus. The optical parametric oscillator realizes rational resonance, achieves the purpose of changing the repetition rate, and realizes dynamic modulation of the loss of the multi-path oscillation cavity, so as to achieve the purpose of multi-wavelength coding.

The disclosure adopts the following technical solutions.

The dynamic Q modulation rational resonance multi-wavelength coding method is characterized by including a pump source, a frequency selector, a wavelength division multiplexer, a parameter conversion medium, an output coupler, a plurality of adjustable delay devices, and a plurality of laser Q modulation devices. The wavelength division multiplexer, the parameter conversion medium, the output coupler, the plurality of adjustable delay devices, and the plurality of laser Q modulation devices form a parametric oscillation cavity having a plurality of feedback paths.

Pump light output by the pump source enters the parametric oscillation cavity through the frequency selector and the wavelength division multiplexer in turn.

The pump light generates a four-wave mixing effect in the parametric conversion medium to generate a beam of signal light having a shorter wavelength than the pump light and a beam of idle frequency light having a longer wavelength than the pump light.

The output coupler directly outputs a part of the light output from the parametric conversion medium, and outputs the other part of the light to form a plurality of paths of feedback light according to different wavelengths.

Each path of feedback light passes through one of the plurality of adjustable delay devices, and one of the plurality of laser Q modulation devices in turn, and returns to the wavelength division multiplexer.

The plurality of laser Q modulation devices are coupled to an encoder, and the encoder is configured to control the corresponding laser Q modulation device to modulate a Q value of the oscillation cavity.

In an embodiment, the pump source is a solid-state laser or an optical fiber laser, and configured to output laser light pulses with a fixed repetition rate.

In an embodiment, the frequency selector is an acoustic optical modulator, and configured to frequency-select laser light pulses output by the pump source to obtain a laser light pulse with a predetermined repetition rate.

In an embodiment, the wavelength division multiplexer is a 1*(n+1) wavelength division multiplexer with a beam combining effect, and configured to couple laser light generated by the pump source and the plurality of paths of feedback light to enter the parametric oscillation cavity.

In an embodiment, the parameter conversion medium is a non-linear optical fiber and configured to perform frequency conversion on the pump light, and perform parametric amplification to compensate for loss of the feedback optical signal in oscillation.

In an embodiment, the output coupler is a 1*(n+1) coupler and configured to split input light and output the light after splitting.

In an embodiment, the adjustable delay device is a single-mode optical fiber or a polarization-maintaining optical fiber, such that feedback light and the pump light coincide when the feedback light and the pump light reach the wavelength division multiplexer.

In an embodiment, the laser Q modulation device is an electro-optic Q-switch or an acousto-optic Q-switch, and configured to adjust a Q value in the oscillation cavity.

The beneficial effects of the disclosure may be as follows.

1. Through the modulation of the n laser Q modulation devices, it may achieve simultaneous resonance of multiple wavelengths.

2. By controlling the laser Q modulation device of each feedback path, each wavelength can be encoded in the time domain.

3. By controlling the laser Q modulation device of each feedback path, repetition rate coding of each wavelength can be realized.

4. By controlling the Laser Q modulation device of each feedback path, wavelength modulation can be achieved.

5. Through the dispersion effect of the delay device, the time-domain width of the feedback pulse is greater than that of the pump pulse. Based on the dispersion filtering effect, the output spectrum can be tuned and narrow-spectrum may be output.

6. Flexible tuning of repetition rate may be realized through rational number resonance.

7. Fully polarization-maintaining optical fiber structure may be used to obtain a stable optical parametric oscillator.

8. If the optical parametric oscillator uses an optical fiber structure, a compact optical parametric oscillator can be realized.

Figure 13:
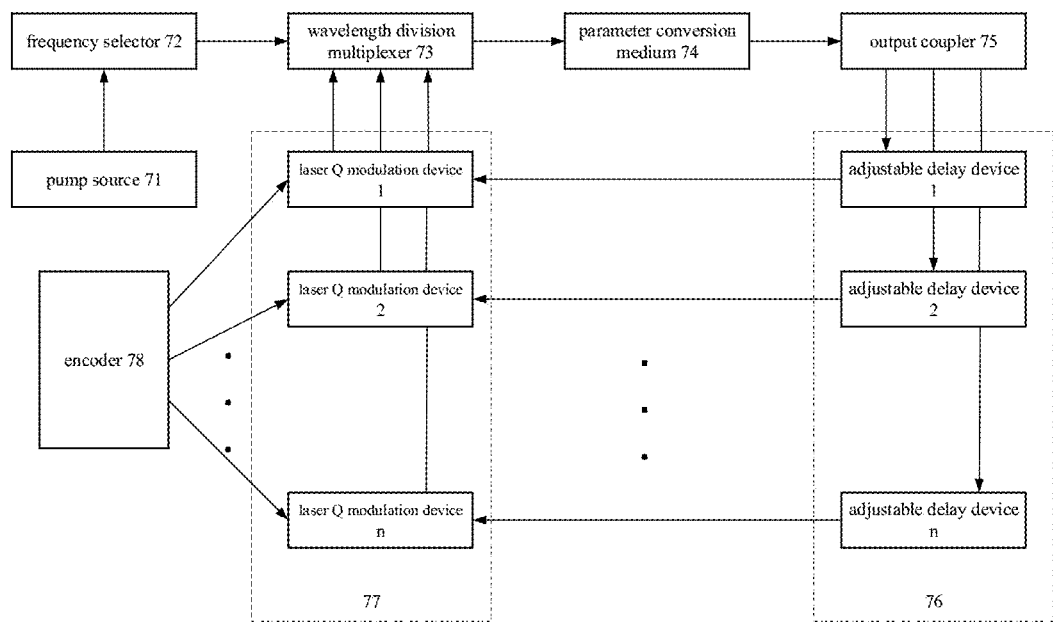
FIG. 13 is a structural schematic diagram of the disclosure.

FIG. 13 is a structural schematic diagram of the disclosure.

As shown in FIG. 13, a dynamic Q-switched rational number resonance multi-wavelength coding method is provided. The structure includes: a pump source 71, a frequency selector 72, a wavelength division multiplexer 73, a parameter conversion medium 74, an output coupler 75, a plurality of adjustable delay devices 76, a plurality of laser Q modulation devices 77, and an encoder 78. The wavelength division multiplexer 73, the parameter conversion medium 74, the output coupler 75, the plurality of adjustable delay devices 76, and the plurality of laser Q modulation devices 77 form a parametric oscillation cavity having a plurality of feedback paths.

The output end of the pump source 71 is coupled to the input end of the frequency selector 72. The output end of the frequency selector 72 is coupled to one of the input ends of the wavelength division multiplexer 73. The wavelength division multiplexer 73 in this embodiment is selected as a 1*(n+1) wavelength division multiplexer. The wavelength division multiplexer 73 is coupled to the parameter conversion medium 74. The parameter conversion medium 74 is coupled to the output coupler 75. The output coupler 75 is selected as 1*(n+1) output coupler. The output coupler 75 has n+1 output ends. One of the n+1 output ends is used as the output end of the oscillator, and the other n output ends may form n outputs according to different wavelengths and be coupled to n adjustable delay devices 76 respectively. Each adjustable delay device 76 is coupled to the laser Q modulation device 77. Each laser Q modulation device 77 is coupled to one of the input ends of the wavelength division multiplexer 73 to form feedback. The encoder 78 is coupled to each laser Q modulation device 77 for modulating the Q value of the n-channel oscillator.

The pump light with a fixed repetition rate, output from the pump source 71, is transmitted to the wavelength division multiplexer 73 through the frequency selector 72. The frequency selector 72 is configured to perform frequency selection on pump light output by the pump source 71. The pump light selected by the frequency selector 72 enters the parameter conversion medium 74 through the wavelength division multiplexer 73. The pump light may generate a four-wave mixing effect in the parametric conversion medium 74 to generate a beam of signal light having a shorter wavelength than the pump light, and a beam of idle frequency light having a longer wavelength than the pump light.

The pump light and the feedback signal light are parametrically amplified in the parametric conversion medium 74, thereby compensating the loss of the feedback signal light in the oscillation to form a stable oscillation. One end of the output coupler 75 outputs a part of the light. The other n output ends of the output coupler 75 may form n outputs according to different wavelengths and are respectively coupled to n adjustable delay devices 76 to feed back the other part of light. The feedback light passes through n laser Q modulation devices 77 and then return to the parametric oscillation cavity through the 1*(n+1) wavelength division multiplexer. The encoder 8 is respectively coupled to n laser Q modulation devices 77 and configured to modulate the Q value of the n-channel oscillation cavity to achieve the purpose of the rational number resonance and multi-wavelength encoding of the disclosure.

Figure 14:
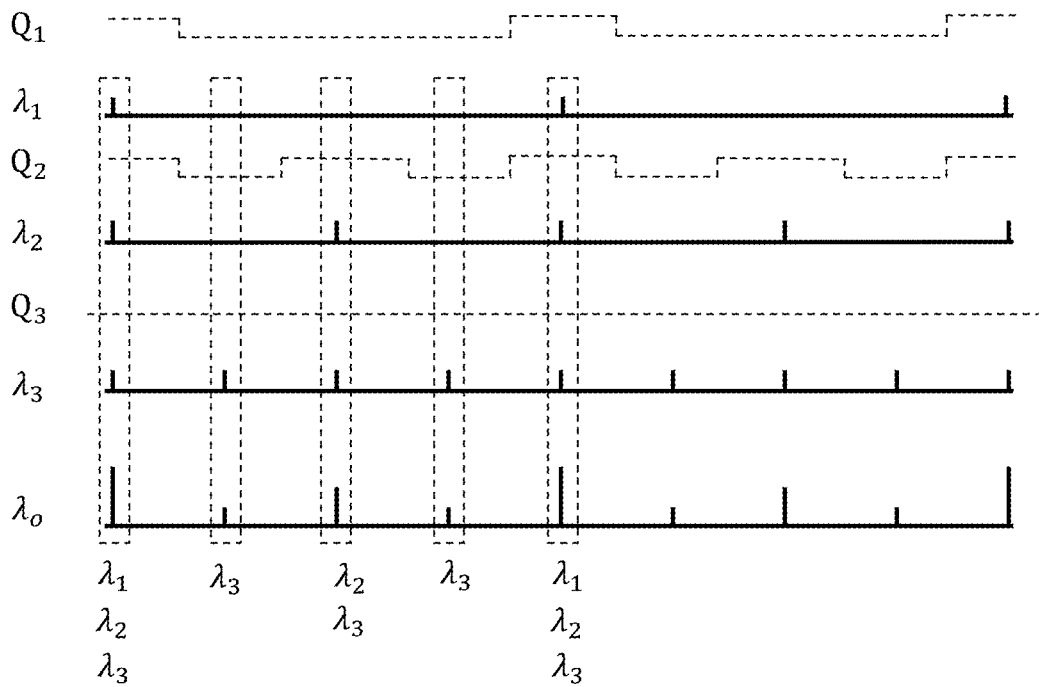
FIG. 14 is a schematic diagram of resonance according to some embodiments of the disclosure.

As shown in FIG. 14, there are three feedback paths. The three laser Q modulation devices 77 are controlled by the encoder 78 at the same time, such that the Q values in the three-path oscillation cavity as shown in FIG. 14. Under modulation of three Q values $Q_1, Q_2, Q_3$, resonance pulses $\lambda_1, \lambda_2, \lambda_3$ are shown in FIG. 14. The combination of $\lambda_1, \lambda_2$, and $\lambda_3$ forms the output resonance pulse sequence $\lambda_0$, of the disclosure. Through Q value modulation as shown in FIG. 14, the repetition rate of $\lambda_1$ is 1f, the repetition rate of $\lambda_2$ is 2f, and the repetition rate of $\lambda_3$ is 4f. The first pulses of the pulse sequences $\lambda_1, \lambda_2, \lambda_3$ are synchronized in time, and are spatially overlapped to form the first pulse of $\lambda_0$. The first pulse of $\lambda_0$ contains three wavelengths of $\lambda_1, \lambda_2, \lambda_3$. It can be seen from FIG. 14 that the second pulse of $\lambda_0$ contains only one wavelength of $\lambda_3$, the third pulse of $\lambda_0$ contains two wavelengths of $\lambda_2, \lambda_3$, the fourth pulse of $\lambda_0$, contains only one wavelength of $\lambda_3$, the fifth pulse of $\lambda_0$ contains three wavelengths of $\lambda_1, \lambda_2, \lambda_3$, thereby forming a periodically-changing pulse sequence. In the case of such Q-value coding, the intensity of each pulse of $\lambda_1, \lambda_2, \lambda_3$ is the same, so the intensity of each pulse of the output resonance pulse $\lambda_0$ is inconsistent. The more the pulses with more wavelengths the stronger the intensity.

Figure 15:
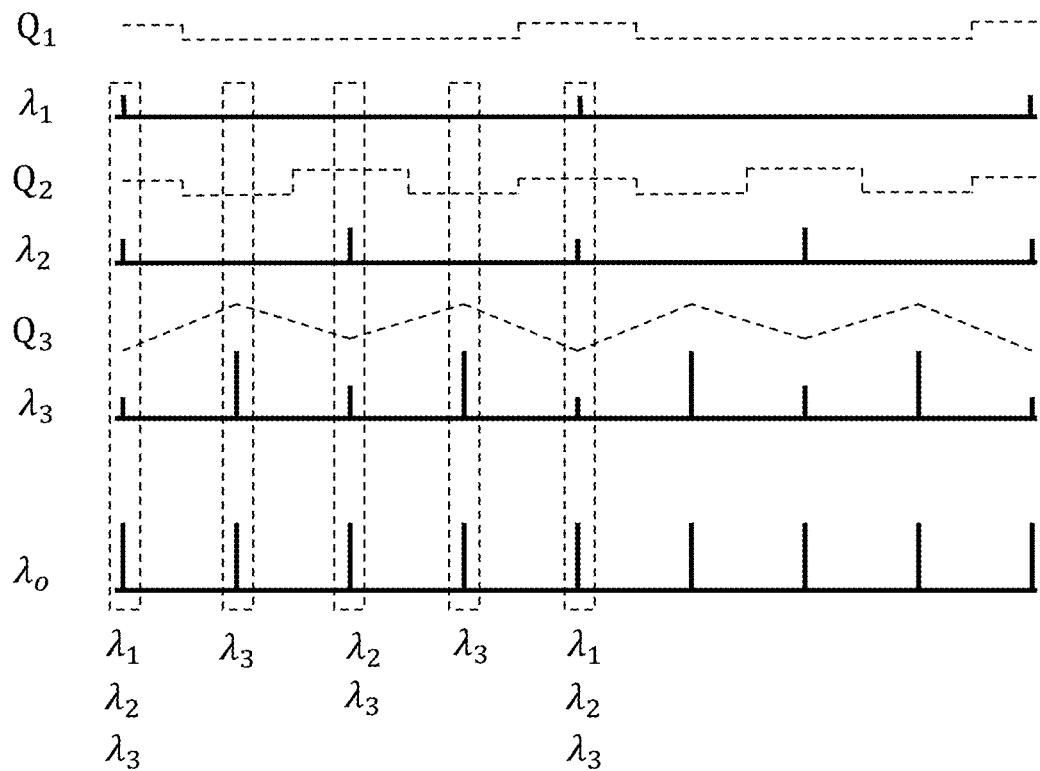
FIG. 15 is a schematic diagram of resonance according to some embodiments of the disclosure.

As shown in FIG. 15, the three laser Q modulation devices 77 are controlled by the encoder 78 at the same time, such that the Q values in the three-path oscillation cavity as shown in FIG. 15. Under modulation of three Q values $Q_1$, $Q_2, Q_3$, resonance pulses $\lambda_1 \lambda_2, \lambda_3$ are shown in FIG. 15. In the case of such Q-value encoding, the pulse intensities of $\lambda_1, \lambda_2, \lambda_3$ are periodically and dynamically modulated, so that the intensity of each pulse of the output pulse $\lambda_0$ is consistent.

FIG. 14 and FIG. 15 show the case of three-path feedback. In this case, the output pulse $\lambda_0$ contains at most three resonance wavelengths $\lambda_1, \lambda_2, \lambda_3$ and is added with the remaining pump light $\lambda_p$. Therefore, the output pulse $\lambda_0$ contains four wavelengths $\lambda_p, \lambda_1, \lambda_2, \lambda_3$ in total. According to the CARS microscopic imaging conditions, two different wavelengths may be used to image a substance, such that the four wavelengths have the following six combinations: $\lambda_p\lambda_1, \lambda_p\lambda_2, \lambda_p\lambda_3, \lambda_1\lambda_2, \lambda_1\lambda_3, \lambda_2\lambda_3$, for simultaneously imaging six different substances. If there are n feedbacks, the output pulse $\lambda_0$ contains at most n resonance wavelengths of $\lambda_1, \lambda_2, \lambda_3, \ldots, \lambda_n$, and is added with the remaining pump light $\lambda_p$, such that the output pulse $\lambda_0$ contains (n+1) wavelengths in total, and there are a total of n*(n+1)/2 combinations. Therefore, t can be used to image n*(n+1)/2 different substances at the same time.

Figure 16:
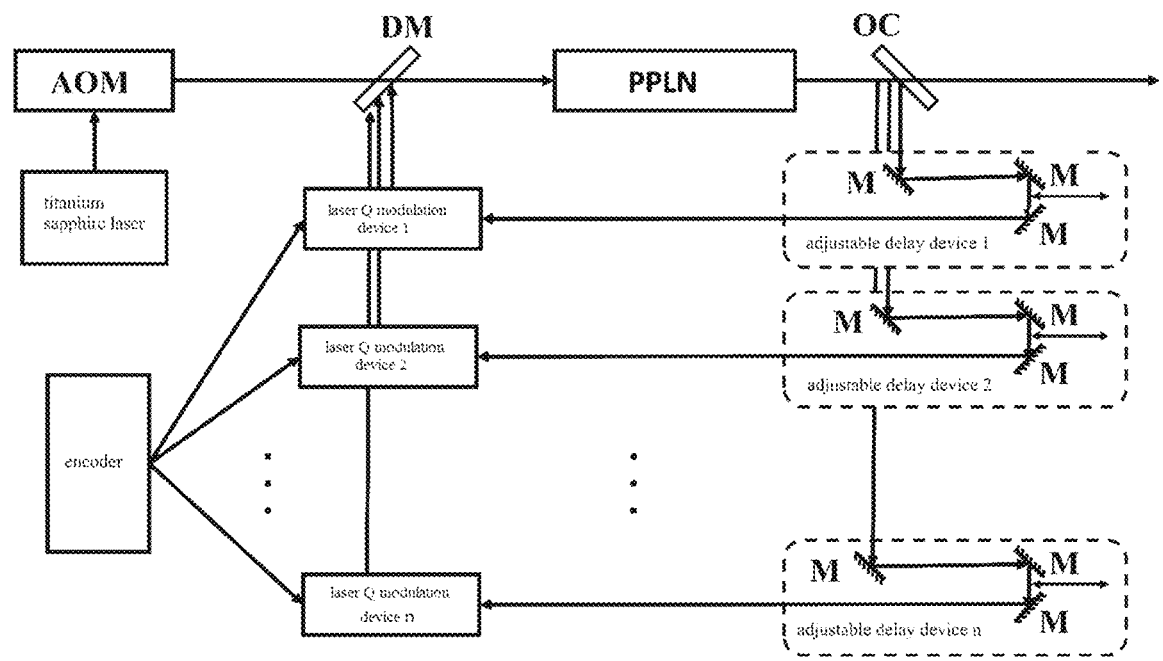
FIG. 16 is a schematic diagram of a space structure including common components of the disclosure.

FIG. 16 is a schematic diagram of a space structure including common components of the disclosure. The apparatus includes: a titanium sapphire laser as a pump source, an acoustic optical modulator (AOM) for frequency selection, a dichroic mirror (DM), a parametric conversion medium crystal such as periodically poled lithium niobate (PPLN), an output coupler (OC), adjustable delay devices, laser Q modulation devices, and an encoder. The DM, the PPLN, the OC, the adjustable delay devices, and the laser Q modulation devices form the parametric oscillation cavity.

The laser light pulse output by the titanium sapphire laser has a wavelength of 1064 nm, and the repetition rate of 50 MHz. After frequency selection of the AOM, the repetition rate of the laser light is reduced to 2 MHz. The pump light enters the PPLN through the DM. The pump light with the wavelength of 1064 nm produces a four-wave mixing effect in the PPL to generate a beam of signal light having a shorter wavelength than the pump light, and a beam of idle frequency light having a longer wavelength than the pump light. The OC transmits a part of the signal light to output, and the other part forms n outputs according to different wavelengths and are respectively coupled to n adjustable delay devices. The feedback light passes through n adjustable delay devices and then passes through n laser Q modulation devices and the DM to return the PPLN. The repetition rate of the oscillation cavity is fixed at 2 MHz, so the delay duration of the adjustable delay device is denoted by a formula 1 of:

$$T = \frac{1}{f_p} = \frac{1}{2 \text{ MHz}} = 500 \text{ ns}. \qquad (1)$$

In order to make the feedback signal light coincide with the pump light to the DM, the feedback signal light has a parametric amplification effect in the PPLN with the pump light thereby compensating the loss of the feedback light signal in the oscillation. The n laser Q modulation devices in the oscillation cavity are controlled by the encoder, to change the loss and resonance threshold in the cavity, realize a variety of time-domain modulation waveforms, and achieve the purposes of the rational number resonance and multi-wavelength encoding of the disclosure.

Figure 17:
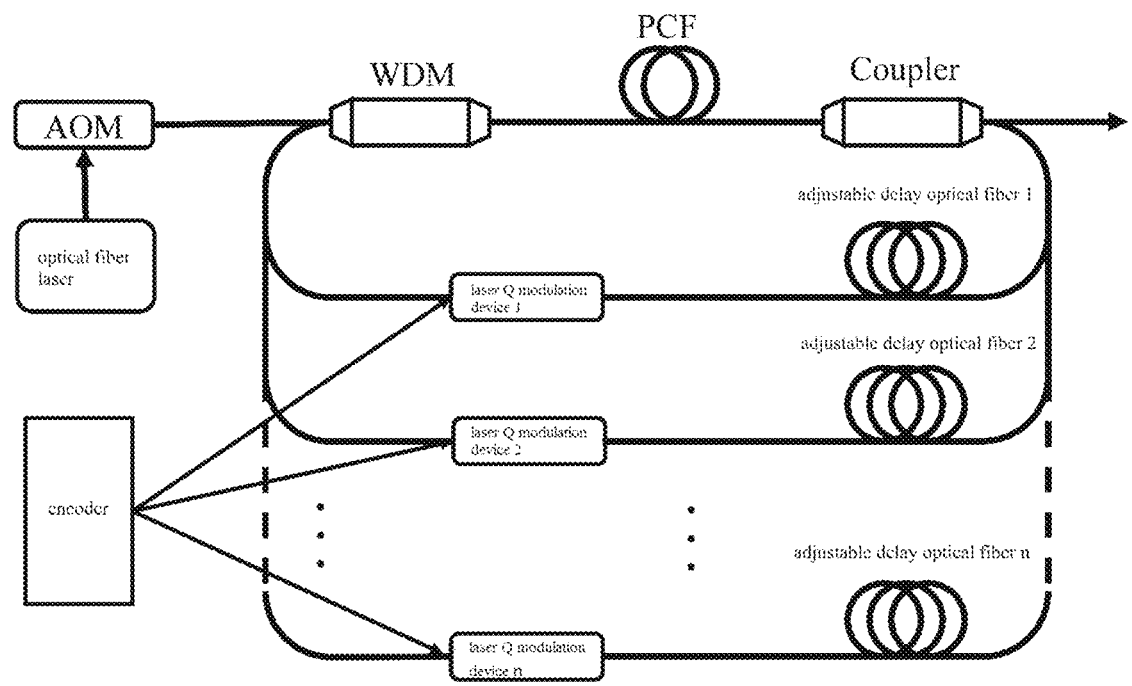
FIG. 17 is a schematic diagram of an optical fiber structure commonly used in the disclosure.

FIG. 17 is a schematic diagram of an optical fiber structure commonly used in the disclosure.

The apparatus includes: an optical fiber laser as a pump source, an AOM for frequency selection, a 1*(n+1) wavelength division multiplexer (WDM), a photonic crystal fiber (PCF), 1*(n+1) output coupler (Coupler), n adjustable delay optical fibers, n laser Q modulation device, and an encoder. The 1*(n+1) WDM, the PCF, 1*(n+1) Coupler, n adjustable delay optical fibers and n laser Q modulation devices form the parametric oscillation cavity.

The laser light pulse output by the optical fiber laser has a wavelength of 1030 nm, and the repetition rate of 20 MHz. After frequency selection of the AOM, the repetition rate of the laser light is reduced to 2 MHz. The pump light enters the PCF through the 1*(n+1) WDM. The pump light with the wavelength of 1030 nm produces a four-wave mixing effect in the PCF to generate a beam of signal light having a shorter wavelength than the pump light, and a beam of idle frequency light having a longer wavelength than the pump light. The 1*(n+1) Coupler transmits a part of the signal light to output, and the other part forms n outputs according to different wavelengths and are respectively coupled to n adjustable delay optical fibers. The feedback light passes through n adjustable delay optical fibers and then passes through n laser Q modulation devices and the 1*(n+1) WDM to return the PCF. The repetition rate of the oscillation cavity is fixed at 2 MHz, so the length of the adjustable delay optical fiber can be obtained by a formula 2 of:

$$L = \frac{c}{f_c n}. \quad (2)$$

where, c represents the speed of light, $f_c$ represents the repetition rate of the oscillation cavity, and n represents the refractive index of the delay optical fiber.

In an embodiment of the disclosure, n=1.5, $f_c$=2 MHz, c=3*10² m/s, and the length of the delay optical fiber is calculated to be 100 meters, to make the feedback signal light and pump light coincide with each other when the feedback signal light and pump light enter the PCF, and make the feedback signal light and pump light have a parametric amplification effect in the PCT, thereby compensating the loss of the feedback light signal in the oscillation. The n laser Q modulation devices in the oscillation cavity are controlled by the encoder, to change the loss and resonance threshold in the cavity, realize a variety of time-domain modulation waveforms, and achieve the purposes of the rational number resonance and multi-wavelength encoding of the disclosure.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples can be combined by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A coherent anti-Stokes Raman scattering imaging method, comprising:
    emitting a beam of pump light and a beam of Stokes light;
    combining the beam of pump light and the beam of Stokes light to a beam of combined light;
    expanding and collimating the beam of combined light, the beam of combined light after the expanding and collimating entering a galvanometer, passing through a group of a scanning lens and a tube lens and being focused on a back focal plane of a microobjective to form a single light spot;
    deflecting, at different angles, the single light spot focused on the back focal plane of the microobjective through a diffractive optics group including a diffractive optical element (DOE) and a dispersive element, into a plurality of light spots to incident into a biological sample, such that anti-Stokes light is excited from the biological sample; and
    collecting the excited anti-Stokes light to obtain an image of the biological sample.

2. The method of claim 1, further comprising:
    adjusting an area of each of the plurality of light spots by dispersive elements with different parameters.

3. A light source, comprising, along an optical path, sequentially a reflective element (31), a dispersive element (32), a first optical switch (33), a gain medium (34), a first output coupler (36), a mode-locking element (35), and a pump source (37) for effecting on the gain medium (34) independently, the first output coupler (36) outputting a beam of seed light,
    a wavelength division multiplexer (38), a second output coupler (39), a polarization controller (310) and a second optical switch (311) in turn along the optical path, wherein the seed light passes through the wavelength division multiplexer (38), the second output coupler (39), the polarization controller (310) and the second optical switch (311) in turn;
    a first branch; and
    a second branch, wherein the beam of seed light is divided into two beams of light, one of the two beams of light enters the first branch and returns the wavelength division multiplexer (38) through the first branch, and another of the two beams of light enters the second branch and returns the wavelength division multiplexer (38) through the second branch; wherein,
    the first branch comprises a first parametric medium (312), a third optical switch (314), a first delay device (315), a second delay device (316), and a first beam combiner (317), the one of the two beams of light enters the first parametric medium (312) and the third optical switch (314) and is divided into two sub beams of light by the third optical switch (314), one of the two sub beams of light enters the first delay device (315), another of the two sub beams of light enters the second delay device (316), and then the two sub beams of light are combined by the first beam combiner (317) and return to the wavelength division multiplexer (38);
    the second branch comprises a second parametric medium (313), a fourth optical switch (318), a third delay device (319), a fourth delay device (320), and a second beam combiner (321), the another of the two beams of light enters the second parametric medium (313) and the fourth optical switch (318) and is divided into two another sub beams of light by the fourth optical switch (318), one of the two another sub beams of light enters the third delay device (319), another of the two another sub beams of light enters the fourth delay device (320), and the two another sub beams of light are combined by the second beam combiner (321) and return to the wavelength division multiplexer (38);
    the wavelength division multiplexer (38) is configured to converge a plurality of beams of light into one beam of light,
    the second output coupler (39) is configured to form loops of parametric resonant cavities and realize multi-wavelength tunable pulse output;
    the polarization controller (310) is configured to adjust a polarization state of light to meet conditions of different four-wave mixing in the medium (312, 313).

4. The light source of claim 3, wherein, the first parametric medium (312) and the second parametric medium (313) are solid non-linear media and expand spectrums by non-linear effects for the light.

5. The light source of claim 4, wherein the solid non-linear media comprises lithium niobate crystals or photonic crystal fibers.

6. The light source of claim 3, wherein, the first delay device (315), the second delay device (316), the third delay device (319), and the fourth delay device (320) are configured to realize optical parameter amplification and narrow filtering.

7. The light source of claim 3, wherein, each of the first delay device (315), the second delay device (316), the third delay device (319) and the fourth delay device (320), comprises a mechanical translation stage, and is configured to change a corresponding cavity length by moving a position of the mechanical translation stage in the delay device.

8. The light source of claim 3, wherein the first optical switch (33), the second optical switch (311), the third optical switch (314), and the fourth optical switch (318) comprise mechanical optical switches, acousto-optic switches or electro-optic switches, and configured to switch among different optical paths to output pulses of different wavelengths.

9. The light source of claim 3, further comprising:
laser Q modulation devices, wherein each of the first delay device (315), the second delay device (316), the third delay device (319) and the fourth delay device (320) is connected a corresponding one of the laser Q modulation devices.

10. The light source of claim 9, further comprising:
an encoder coupled to the laser Q modulation devices, and configured to control the laser Q modulation devices to modulate a Q value of the parametric resonant cavity.

11. A multi-wavelength resonance coding apparatus, comprising a pump source (71), a frequency selector (72), a wavelength division multiplexer (73), a parameter conversion medium (74), an output coupler (75), a plurality of adjustable delay devices (76), and a plurality of laser Q modulation devices (77), wherein the wavelength division multiplexer (73), the parameter conversion medium (74), the output coupler (75), the plurality of adjustable delay devices (76), and the plurality of laser Q modulation devices (77) form a parametric oscillation cavity having a plurality of feedback paths;
pump light output by the pump source (71) enters the parametric oscillation cavity through the frequency selector (72) and the wavelength division multiplexer (73) in turn;
the pump light generates a four-wave mixing effect in the parametric conversion medium (74) to generate a beam of signal light having a shorter wavelength than the pump light, and a beam of idle frequency light having a longer wavelength than the pump light;
the output coupler (75) directly outputs a part of the light output from the parametric conversion medium (74), and outputs the other part of the light to form a plurality of paths of feedback light according to different wavelengths;
each path of feedback light passes through one of the plurality of adjustable delay devices (76), and one of the plurality of laser Q modulation devices (77) in turn, and returns to the wavelength division multiplexer (73);
The plurality of laser Q modulation devices (77) are coupled to an encoder (78), and the encoder (78) is configured to control the corresponding laser Q modulation device (77) to modulate a Q value of the oscillation cavity.

12. The method of claim 11, wherein the pump source (71) is a solid-state laser or an optical fiber laser, and configured to output laser light pulses with a fixed repetition rate.

13. The method of claim 11, wherein the frequency selector (72) is an acoustic optical modulator, and configured to frequency-select laser light pulses output by the pump source (71) to obtain a laser light pulse with a predetermined repetition rate.

14. The method of claim 11, wherein the wavelength division multiplexer (73) is a 1*(n+1) wavelength division multiplexer with a beam combining effect, and configured to couple laser light generated by the pump source (71) and the plurality of paths of feedback light to enter the parametric oscillation cavity.

15. The method of claim 11, wherein the parameter conversion medium (74) is a non-linear optical fiber and configured to perform frequency conversion on the pump light, and perform parametric amplification on to compensate for loss of the feedback optical signal in oscillation.

16. The method of claim 11, wherein the output coupler (75) is a 1*(n+1) coupler and configured to split input light and output the light after splitting.

17. The method of claim 11, wherein the adjustable delay device (76) is a single-mode optical fiber or a polarization-maintaining optical fiber, such that feedback light and the pump light coincide when the feedback light and the pump light reach the wavelength division multiplexer (73).

18. The method of claim 11, wherein the laser Q modulation device (77) is an electro-optic Q-switch or an acousto-optic Q-switch, and configured to adjust a Q value in the oscillation cavity.

* * * * *